(12) United States Patent
Mochizuki et al.

(10) Patent No.: US 10,855,639 B2
(45) Date of Patent: Dec. 1, 2020

(54) INFORMATION PROCESSING APPARATUS AND INFORMATION PROCESSING METHOD FOR SELECTION OF A TARGET USER

(71) Applicant: SONY CORPORATION, Tokyo (JP)

(72) Inventors: Daisuke Mochizuki, Chiba (JP); Norihiko Sato, Tokyo (JP); Shosuke Momotani, Kanagawa (JP); Kunihiko Miyake, Kanagawa (JP); Yuya Hirano, Tokyo (JP); Kanahiro Shirota, Kanagawa (JP); Futoshi Takeuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 294 days.

(21) Appl. No.: 15/554,515

(22) PCT Filed: Jan. 18, 2016

(86) PCT No.: PCT/JP2016/051327
§ 371 (c)(1),
(2) Date: Aug. 30, 2017

(87) PCT Pub. No.: WO2016/147693
PCT Pub. Date: Sep. 22, 2016

(65) Prior Publication Data
US 2018/0048608 A1   Feb. 15, 2018

(30) Foreign Application Priority Data

Mar. 13, 2015   (JP) .................. 2015-050623

(51) Int. Cl.
*H04L 12/58* (2006.01)
*G06F 40/279* (2020.01)
*G10L 25/63* (2013.01)

(52) U.S. Cl.
CPC ............ *H04L 51/24* (2013.01); *G06F 40/279* (2020.01); *G10L 25/63* (2013.01); *H04L 51/14* (2013.01); *H04L 51/20* (2013.01); *H04L 51/32* (2013.01)

(58) Field of Classification Search
CPC ............ G06F 17/2765; G06Q 30/0241; G06Q 30/0271; G06Q 30/0277; G06Q 50/01;
(Continued)

(56) References Cited

U.S. PATENT DOCUMENTS

2004/0098469 A1   5/2004 Kindo et al.
2008/0233999 A1*  9/2008 Willigenburg .... H04M 1/27455
                                                    455/556.1
(Continued)

FOREIGN PATENT DOCUMENTS

CN   101800815 A   8/2010
CN   103631851 A   3/2014
(Continued)

OTHER PUBLICATIONS

International Search Report and Written Opinion of PCT Application No. PCT/JP2016/051327, dated Apr. 5, 2016, 02 pages of English Translation and 09 pages of ISRWO.

*Primary Examiner* — Christopher Biagini
(74) *Attorney, Agent, or Firm* — Chip Law Group

(57) ABSTRACT

Provided is an information processing apparatus including a selecting unit that selects a second user to be a target of notification of information on the basis of a result of behavior recognition with respect to a first user.

18 Claims, 17 Drawing Sheets

(58) Field of Classification Search
CPC ....... G10L 25/63; H04L 51/043; H04L 51/08;
H04L 51/14; H04L 51/20; H04L 51/22;
H04L 51/24; H04L 51/26; H04L 51/32;
H04L 67/22; H04L 67/325; H04L 67/327;
H04L 67/42
See application file for complete search history.

(56) References Cited

U.S. PATENT DOCUMENTS

| | | | | |
|---|---|---|---|---|
| 2009/0012925 | A1* | 1/2009 | Brown | G06Q 30/02 706/46 |
| 2009/0106040 | A1* | 4/2009 | Jones | G06Q 30/02 705/319 |
| 2009/0143056 | A1* | 6/2009 | Tang | H04W 4/20 455/418 |
| 2010/0199340 | A1* | 8/2010 | Jonas | G06Q 10/10 726/8 |
| 2010/0203900 | A1 | 8/2010 | Khokhlov | |
| 2012/0278262 | A1* | 11/2012 | Morgenstern | G06Q 10/10 706/12 |
| 2012/0278740 | A1* | 11/2012 | Robinson | G06Q 10/10 715/757 |
| 2013/0117292 | A1* | 5/2013 | Axelrod | G06Q 10/06 707/758 |
| 2014/0011481 | A1* | 1/2014 | Kho | H04W 4/029 455/414.1 |
| 2014/0032452 | A1* | 1/2014 | Perkowitz | H04W 4/21 706/12 |
| 2014/0046939 | A1* | 2/2014 | Xu | G06Q 50/01 707/732 |
| 2014/0059040 | A1* | 2/2014 | Cha | G06Q 30/0241 707/722 |
| 2014/0156746 | A1* | 6/2014 | Wheatley | H04L 67/22 709/204 |
| 2015/0170652 | A1* | 6/2015 | Kaplan | G10L 15/22 704/246 |

FOREIGN PATENT DOCUMENTS

| | | |
|---|---|---|
| DE | 60223706 | 10/2008 |
| EP | 1443408 A1 | 8/2004 |
| EP | 2216737 A1 | 8/2010 |
| EP | 2701103 A2 | 2/2014 |
| GB | 2467578 A | 8/2010 |
| JP | 2002-218025 A | 8/2002 |
| JP | 2003-216564 A | 7/2003 |
| JP | 2010-182308 A | 8/2010 |
| JP | 2014-044721 A | 3/2013 |
| JP | 2013-77110 A | 4/2013 |
| JP | 2013-077110 A | 4/2013 |
| JP | 2014-063526 A | 4/2013 |
| JP | 2014-044721 A | 3/2014 |
| JP | 2014-44721 A | 3/2014 |
| JP | 2014-063526 A | 4/2014 |
| JP | 2014-63526 A | 4/2014 |
| JP | 2014-123192 A | 7/2014 |
| KR | 10-2010-0090656 A | 8/2010 |
| KR | 10-2014-0027011 A | 3/2014 |

\* cited by examiner

| FIRST USER | SECOND USER | RELEVANCE |
|---|---|---|
| USER U1 | USER U3 | +0.2 |
| USER U1 | USER UN | +0.8 |
| USER U1 | USER U2 | +0.5 |
| USER U2 | USER U1 | −0.1 |
| ⋮ | ⋮ | ⋮ |

|  | USER U1 | ... | USER UN |
|---|---|---|---|
| OFFICE | −0.2 | ... | +0.7 |
| FOOTBALL GROUND | +0.0 | ... | +0.6 |
| ⋮ | ⋮ | ⋮ | ⋮ | ized
INFORMATION PROCESSING APPARATUS AND INFORMATION PROCESSING METHOD FOR SELECTION OF A TARGET USER

CROSS REFERENCE TO RELATED APPLICATIONS

This application is a U.S. National Phase of International Patent Application No. PCT/JP2016/051327 filed on Jan. 18, 2016, which claims priority benefit of Japanese Patent Application No. JP 2015-050623 filed in the Japan Patent Office on Mar. 13, 2015. Each of the above-referenced applications is hereby incorporated herein by reference in its entirety.

TECHNICAL FIELD

The present disclosure relates to an information processing apparatus, an information processing method, and a program.

BACKGROUND ART

In recent years, in accordance with development of an information communication technology, a technology for performing communication with other users using terminals is widely spread. Here, a technology for controlling a timing for starting communication with other users is known. For example, a technology for controlling a timing for starting communication with other users based on behavior of the other users is disclosed (see, for example, Patent Literature 1).

CITATION LIST

Patent Literature

Patent Literature 1: JP 2014-123192A

DISCLOSURE OF INVENTION

Technical Problem

However, it is desired to provide a technology which is capable of lowering a psychological barrier to perform communication with other users.

Solution to Problem

According to the present disclosure, there is provided an information processing apparatus including a selecting unit configured to select a second user to be a target of notification of information on the basis of a result of behavior recognition with respect to a first user.

According to the present disclosure, there is provided an information processing method including selecting a second user to be a target of notification of information on the basis of a result of behavior recognition with respect to a first user.

According to the present disclosure, there is provided a program for causing a computer to function as an information processing apparatus comprising a selecting unit configured to select a second user to be a target of notification of information on the basis of a result of behavior recognition with respect to a first user.

Advantageous Effects of Invention

As described above, according to the present disclosure, a technology which is capable of lowering a psychological barrier to perform communication with other users is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating a data configuration example of the human relationship DB according to a first behavior recognition example.

FIG. 13 is a diagram illustrating a data configuration example of the correspondence relationship DB according to a second behavior recognition example.

MODE FOR CARRYING OUT THE INVENTION

Figure 1:
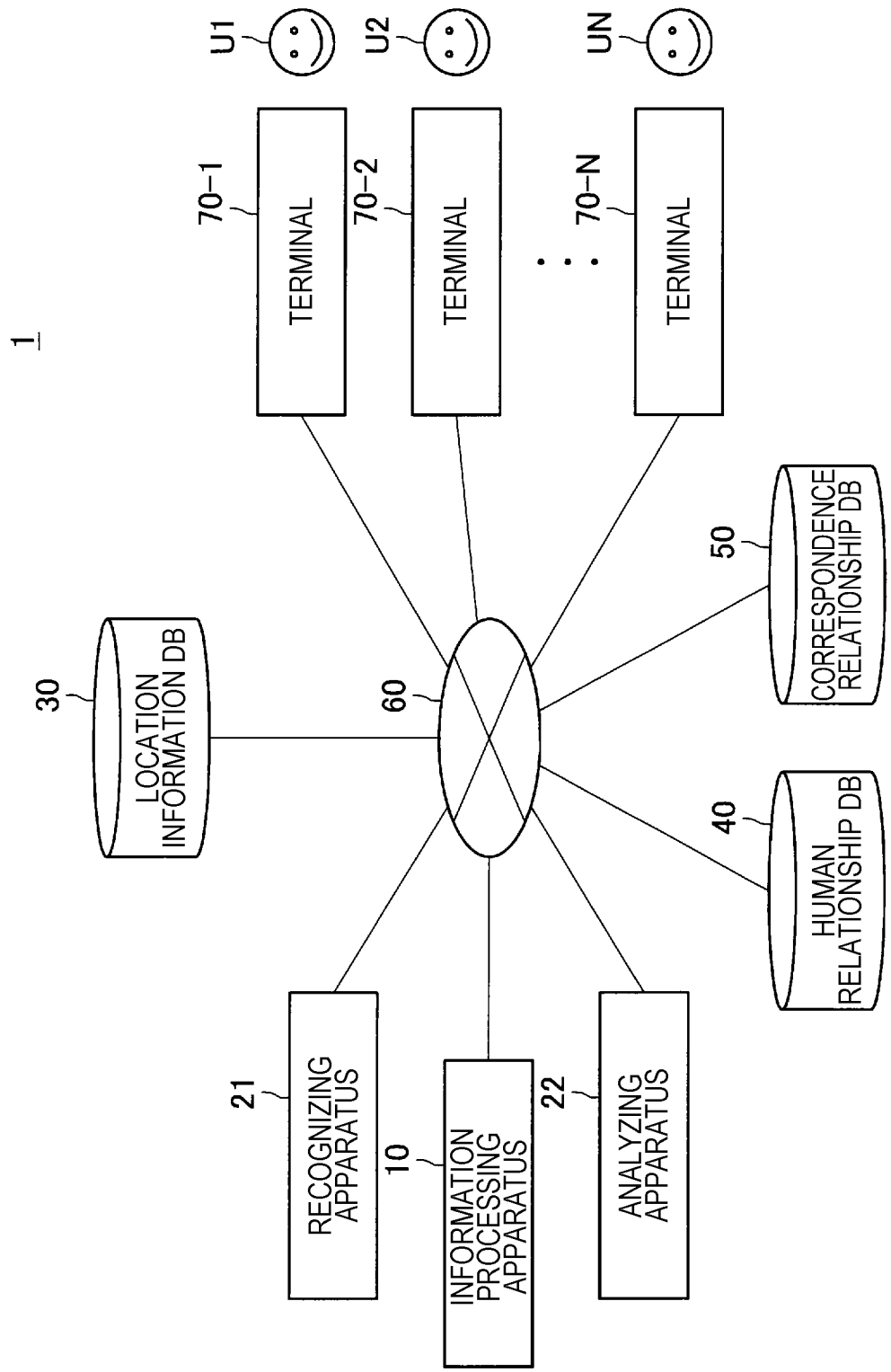
FIG. 1 is a diagram illustrating a configuration example of an information processing system according to an embodiment of the present disclosure.

Hereinafter, a preferred embodiment of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Note that description will be provided in the following order.
1. Embodiment of present disclosure
1.1. System configuration example
1.2. Functional configuration example
1.3. Example of generation of database
1.4. Details of function (analysis of communication content)
1.5. Details of function (recognition of user state)
1.6. Hardware configuration example
2. Conclusion 1. Embodiment of Present Disclosure

[1.1. System Configuration Example]

First, a configuration example of an information processing system according to an embodiment of the present disclosure will be described with reference to the drawings. FIG. 1 is a diagram illustrating a configuration example of an information processing system 1 according to the embodiment of the present disclosure. As illustrated in FIG. 1, the information processing system 1 according to the embodiment of the present disclosure includes an information processing apparatus 10, a recognizing apparatus 21, an analyzing apparatus 22, a location information DB (database) 30, a human relationship DB 40, a correspondence relationship DB 50 and terminals 70-1 to 70-N (where N is a natural number equal to or greater than 2).

The terminals 70-1 to 70-N are respectively utilized by corresponding users U1 to UN. While a case will be described as an example in the present specification where the terminals 70-1 to 70-N are smartphones, the terminals 70-1 to 70-N are not limited to smartphones. For example, the terminals 70-1 to 70-N may be personal computers (PCs), mobile phones, tablet PCs, personal digital assistants (PDAs), wearable devices, or the like. A specific example of a wearable device will be described later.

The location information DB 30 is a database which stores location information of the respective users U1 to UN. For example, the location information DB 30 stores location information (longitude, latitude, altitude) of the respective users U1 to UN measured by the terminals 70-1 to 70-N. Note that a method for measuring the locations of the users U1 to UN is not particularly limited. For example, the terminals 70-1 to 70-N may measure location information of the terminals 70-1 to 70-N based on GPS signals received by a global positioning system (GPS) receiver.

The human relationship DB 40 is a database which stores relevance between a first user and a second user which are arbitrarily selected from the users U1 to UN. Here, a method for expressing relevance between the first user and the second user is not particularly limited. For example, a greater value may indicate stronger relevance. A detailed configuration example of the human relationship DB 40 will be described later. Further, an example of generation of the human relationship DB 40 will be also described later.

The correspondence relationship DB 50 is a database which stores relevance between one user which is arbitrarily selected from the users U1 to UN and a target (such as, for example, an object, a location) other than the users U1 to UN. Here, a method for expressing the relevance is not particularly limited. For example, a greater value may indicate stronger relevance between one user and a target other than the users U1 to UN. A detailed configuration example of the correspondence relationship DB 50 will be described later. Further, an example of generation of the correspondence relationship DB 50 will be also described later.

The recognizing apparatus 21 performs user state recognition operation as an example of operation for recognizing behavior of the respective users U1 to UN. More specifically, the recognizing apparatus 21 recognizes user states of the respective users U1 to UN based on sensor data detected by the terminals 70-1 to 70-N. Algorithm of behavior recognition is not particularly limited. Further, a result obtained by the behavior recognition is not particularly limited. For example, the result obtained by the behavior recognition may be a location where the user exists. The location where the user exists may be name of a school building, a library, station, a store, facility, a building, office, or the like, or may be an area specified by address. Further, the result obtained by the behavior recognition may be action of the user. The action of the user may be action such as walking, running, going up and down stairs, driving a car, shopping and working.

The analyzing apparatus 22 performs operation of analyzing conversation content as an example of operation for recognizing behavior of the respective users U1 to UN. More specifically, the analyzing apparatus 22 extracts information (such as, for example, a noun and a topic in conversation) appearing in communication of the respective users U1 to UN as extracted information by analyzing communication content of the respective users U1 to UN. A topic in conversation may be a form of a sentence such as " . . . did . . . at . . . ". Note that a method for analyzing communication content is not limited. For example, in the case where the communication content is character information, an extracted word can be extracted through language analysis such as morphological analysis from the communication content.

The information processing apparatus 10 is an apparatus which performs various kinds of information processing. Here, a case will be assumed where communication is started with another user. In this case, in the case where a state of the another user cannot be recognized, there is a case where a user feels a psychological barrier to perform communication with the another user. Therefore, in the present specification, a technology which is capable of lowering a psychological barrier to perform communication with other users will be mainly proposed.

The configuration example of the information processing system 1 according to the embodiment of the present disclosure has been described above.

[1.2. Functional Configuration Example]

Figure 2:
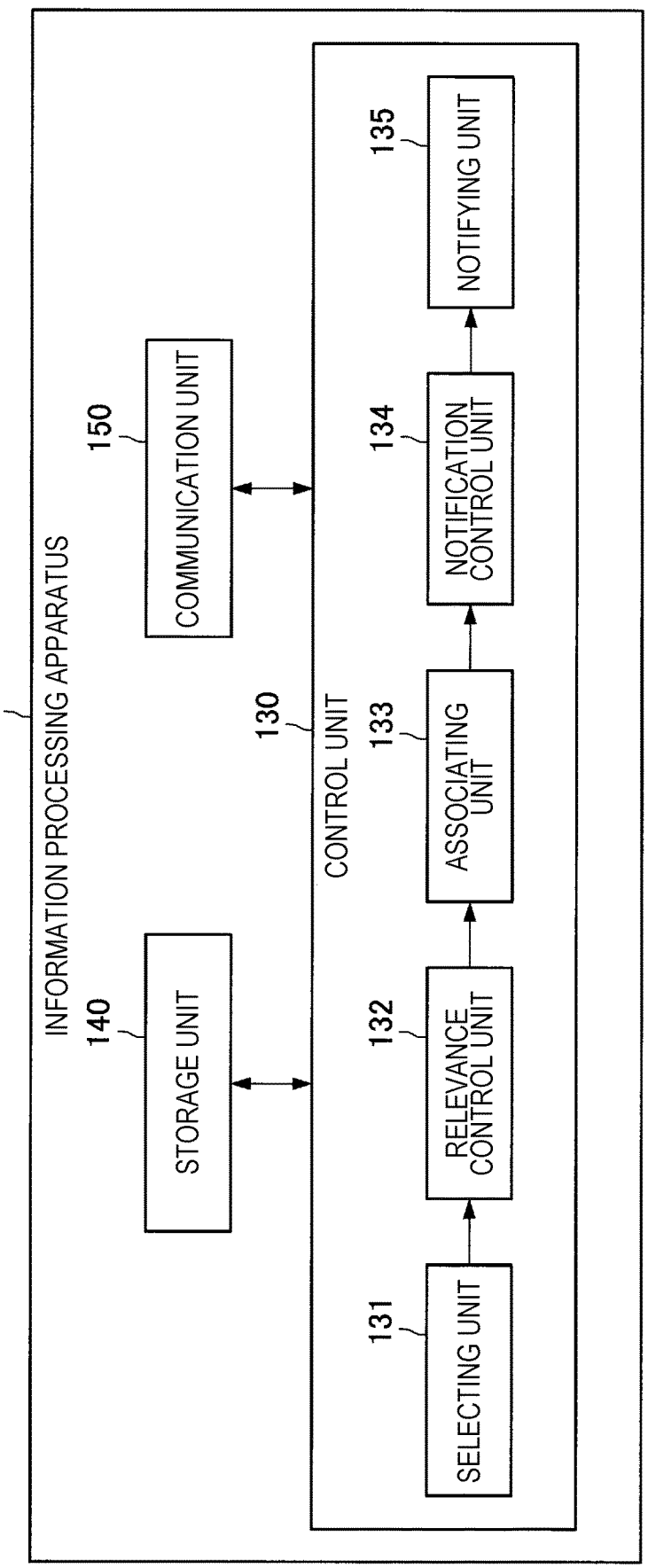
FIG. 2 is a block diagram illustrating a functional configuration example of an information processing apparatus according to the embodiment.

Subsequently, a functional configuration example of the information processing apparatus 10 according to the embodiment of the present disclosure will be described. FIG. 2 is a block diagram illustrating the functional configuration example of the information processing apparatus 10 according to the embodiment of the present disclosure. As illustrated in FIG. 2, the information processing apparatus 10 according to the embodiment of the present disclosure includes a control unit 130, a storage unit 140 and a communication unit 150.

The control unit 130 corresponds to, for example, a processor such as a central processing unit (CPU). The control unit 130 fulfills various functions of the control unit 130 by executing a program stored in the storage unit 140 or other storage media. The control unit 130 has various functional blocks such as a selecting unit 131 and a notifying unit 132. Functions of these functional blocks will be described later. Note that, in the case where the control unit 130 is configured with a processor such as a CPU, the processor can be configured with an electronic circuit.

The storage unit 140 stores a program for causing the control unit 130 to operate using a storage medium such as a semiconductor memory and a hard disk. Further, for example, the storage unit 140 can also store various kinds of data to be used by the program. Note that, while the storage unit 140 is integrated with the information processing apparatus 10 in the example illustrated in FIG. 2, the storage unit 140 may be configured separately from the information processing apparatus 10.

The communication unit 150 can perform communication with other apparatuses. The communication unit 150 can perform communication via a network 60 in the case where the communication unit 150 performs communication with other apparatuses. A communication format by the communication unit 150 is not particularly limited, and communication by the communication unit 150 may be wireless communication or wire communication. Note that, while the communication unit 150 is integrated with the information processing apparatus 10 in the example illustrated in FIG. 2, the communication unit 150 may be configured separately from the information processing apparatus 10.

The functional configuration example of the information processing apparatus 10 according to the embodiment of the present disclosure has been described above.

Figure 3:
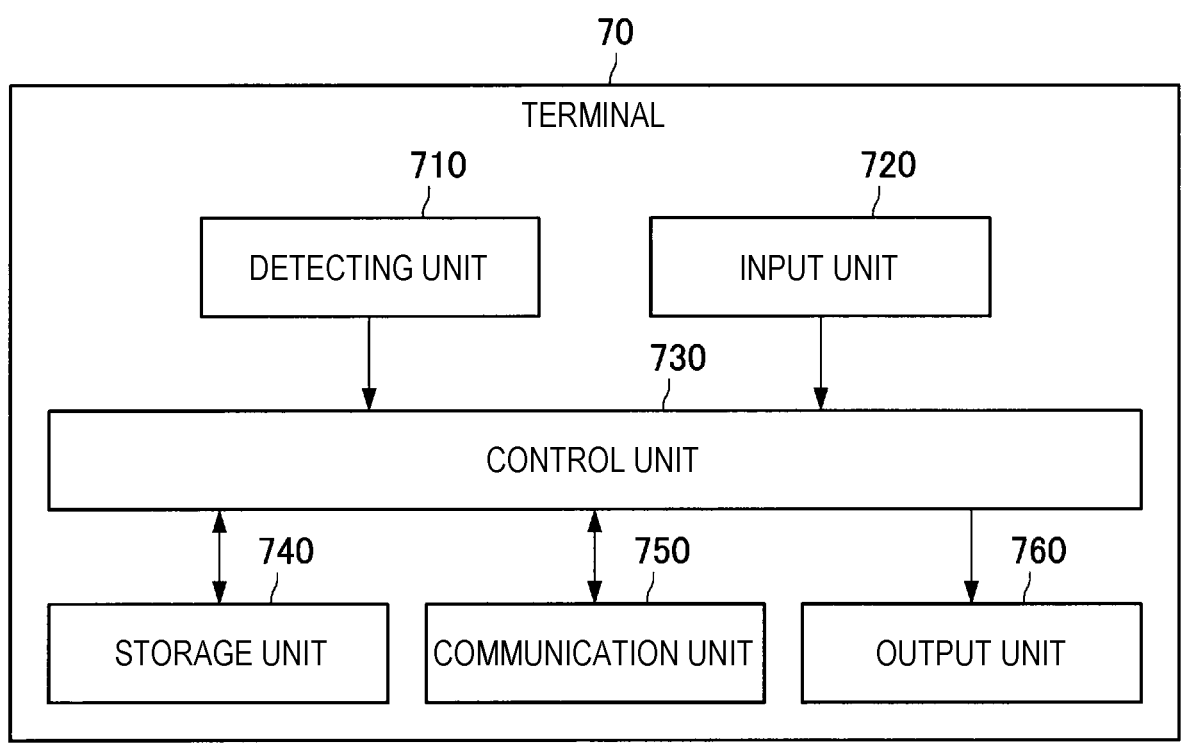
FIG. 3 is a block diagram illustrating a functional configuration example of a terminal according to the embodiment.

Subsequently, a functional configuration example of the terminal 70 according to the embodiment of the present disclosure will be described. FIG. 3 is a block diagram illustrating the functional configuration example of the terminal 70 according to the embodiment of the present disclosure. As illustrated in FIG. 3, the terminal 70 according to the embodiment of the present disclosure includes a detecting unit 710, an input unit 720, a control unit 730, a storage unit 740, a communication unit 750 and an output unit 760.

The detecting unit 710 outputs data (hereinafter, also referred to as "sensing data") detected through sensing to the control unit 730. For example, the detecting unit 710 can include an acceleration sensor which detects acceleration as sensing data, a gyro sensor which detects angular velocity as sensing data, and an illuminance sensor which detects illuminance as sensing data. Further, the detecting unit 710 can include a microphone which detects sound information as sensing data. Still further, the detecting unit 710 can include an image pickup apparatus which detects a picked up image as sensing data. Note that, while the detecting unit 710 is integrated with the terminal 70 in the example illustrated in FIG. 3, the detecting unit 710 may be configured separately from the terminal 70.

The input unit 720 detects operation by the user and outputs the result to the control unit 730. For example, in the case where the input unit 720 is configured with a touch panel, the operation by the user can correspond to operation to the touch panel (such as, for example, tap operation and drag operation). However, the input unit 720 may be configured with a hardware (such as, for example, a button) other than the touch panel. For example, a recognition result that the user is "grasping" or "looking at" the terminal 70 may be detected as the operation. Such a recognition result may be detected based on a contact state of the hand of the user with respect to the terminal 70 obtained from information of a contact sensor (such as, for example, a touch sensor and a pressure sensor) which is located at the side of the terminal 70 and which is not illustrated. Further, such a recognition result may be detected by extracting a predetermined movement pattern from output information of a motion sensor (such as, for example, an acceleration sensor and a gyro sensor) which is not illustrated. Still further, such a recognition result may be detected by the face being recognized from an image picked up by a camera which is provided at the terminal 70 and which is not illustrated. Note that, while the input unit 720 is integrated with the terminal 70 in the example illustrated in FIG. 3, the input unit 720 may be configured separately from the terminal 70.

The control unit 730 corresponds to, for example, a processor such as a CPU. The control unit 730 fulfills various functions of the control unit 730 by executing a program stored in the storage unit 740 or other storage media. Note that, in the case where the control unit 130 is configured with a processor such as a CPU, such a processor can be configured with an electronic circuit.

The storage unit 740 stores a program for causing the control unit 730 to operate using a storage medium such as a semiconductor memory and a hard disk. Further, for example, the storage unit 740 can also store various kinds of data to be used by the program. Note that, while the storage unit 740 is integrated with the terminal 70 in the example illustrated in FIG. 3, the storage unit 740 may be configured separately from the terminal 70.

The communication unit 750 can perform communication with other apparatuses. The communication unit 750 can perform communication via a network 60 in the case where, for example, the communication unit 750 performs communication with other apparatuses. A communication format by the communication unit 750 is not particularly limited, and communication by the communication unit 750 may be wireless communication or wire communication. Note that, while the communication unit 750 is integrated with the terminal 70 in the example illustrated in FIG. 3, the communication unit 750 may be configured separately from the terminal 70.

The output unit 760 outputs various kinds of information according to control by the control unit 730. The output unit 760 can include a display apparatus such as, for example, a liquid crystal display (LCD) and an organic electroluminescence (EL) display apparatus. Further, the output unit 760 can include a vibration device. Still further, for example, the output unit 760 may include a light emitting diode (LED) which emits light, separately from the display apparatus.

Further, for example, the output unit 760 may include a speaker which outputs sound. Note that, while the output unit 760 is integrated with the terminal 70 in the example illustrated in FIG. 3, the output unit 760 may be configured separately from the terminal 70. For example, in the case where the output unit 760 includes a speaker which outputs sound, the speaker may be earphones or a headphone. In this event, an output apparatus which is connected to the terminal 70 in a wired or wireless manner may be dealt with as the output unit 760.

The functional configuration example of the terminal 70 according to the embodiment of the present disclosure has been described above.

[1.3. Example of Generation of Database]

Figure 4:
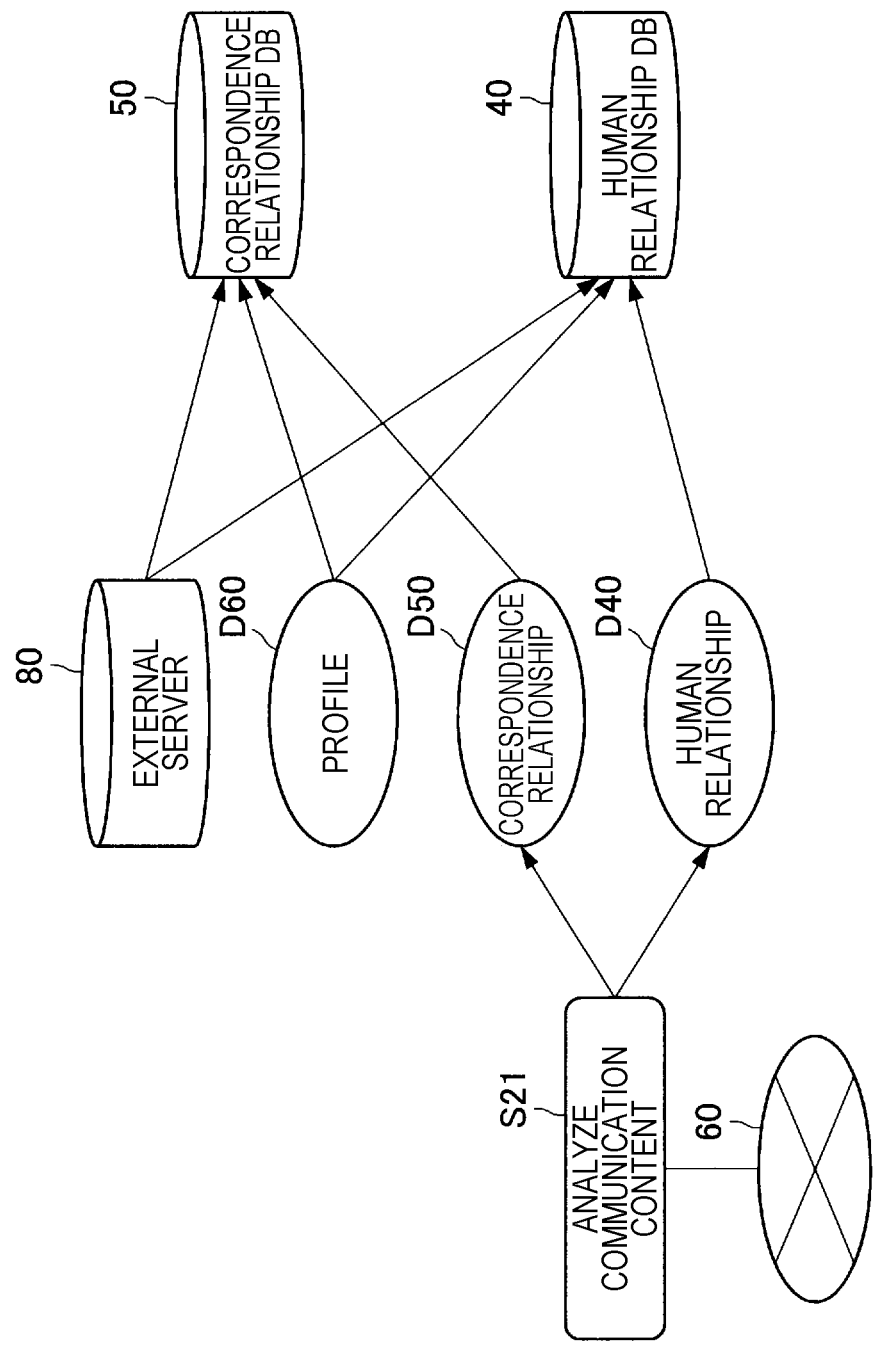
FIG. 4 is a diagram illustrating an example of generation of a human relationship DB and a correspondence relationship DB.

Subsequently, an example of generation of a human relationship DB and a correspondence relationship DB will be described. FIG. 4 is a diagram illustrating an example of generation of the human relationship DB and the correspondence relationship DB. However, because the example illustrated in FIG. 4 is merely an example of generation of the human relationship DB and the correspondence relationship DB, generation of the human relationship DB and the correspondence relationship DB is not limited to the example illustrated in FIG. 4. Further, the human relationship DB and the correspondence relationship DB may be generated by the information processing apparatus 10.

As illustrated in FIG. 4, human relationship acquired from an external server 80 may be registered in the human relationship DB 40, and correspondence relationship acquired from the external server 80 may be registered in the correspondence relationship DB 50. The external server 80 may be a server of a social networking service (SNS), or the like. Further, as illustrated in FIG. 4, human relationship acquired from profile D60 registered in SNS may be registered in the human relationship DB 40, and correspondence relationship acquired from the profile D60 may be registered in the correspondence relationship DB 50.

Alternatively, as illustrated in FIG. 4, human relationship D40 obtained through analysis (S21) of communication content stored by the external server 80 may be registered in the human relationship DB 40. Further, correspondence relationship D50 obtained through analysis (S21) of communication content stored by the external server 80 may be registered in the correspondence relationship DB 50. Note that, in the case where there exists relationship of users whose relevance changes in the human relationship DB 40, relevance between other users may change in conjunction with the change.

The example of generation of the human relationship DB and the correspondence relationship DB has been described above.

[1.4. Details of Function (Analysis of Communication Content)]

Subsequently, details of functions of the information processing system 1 according to the embodiment of the present disclosure will be described. In the embodiment of the present disclosure, at the information processing apparatus 10, the selecting unit 131 selects a second user to be notified of information based on a result of behavior recognition with respect to a first user. According to this configuration, by notification information notified from the information processing apparatus 10 being perceived by the second user, it is possible to lower a psychological barrier of the second user to perform communication with the first user. The notification control unit 134 determines notification information to be notified to the second user selected by the selecting unit 131. There may be one second user or a plurality of second users. The notifying unit 135 notifies the second user of the notification information according to control by the notification control unit 134.

First, as a first example of behavior recognition with respect to the first user, an example where analysis of communication content of the first user will be described. Note that, in the following description, at the information processing apparatus 10, the selecting unit 131 selects a user UN based on a result of behavior recognition with respect to the user U3, and the notifying unit 132 notifies the terminal 70-N of the user UN of predetermined notification information. However, the user who is a target of behavior recognition is not limited to the user U3. Further, a reception side user of the notification information is not limited to the user UN.

FIG. 5 is a diagram illustrating a data configuration example of the human relationship DB 40 according to the first behavior recognition example. As illustrated in FIG. 5, in the human relationship DB 40, combination of the first user, the second user and relevance between these users (a degree of interest of the first user with respect to the second user) is registered. In the example illustrated in FIG. 5, as combination of (the first user, the second user, relevance), (user U1, user U3, +0.2) and (user U1, user UN, +0.8) are registered. Further, in the example illustrated in FIG. 5, as combination of (the first user, the second user, relevance), (user U1, user U2, +0.5) and (user U2, user U1, −0.1) are registered. As indicated in this example, relevance may be asymmetric between the first user and the second user.

Figure 6:
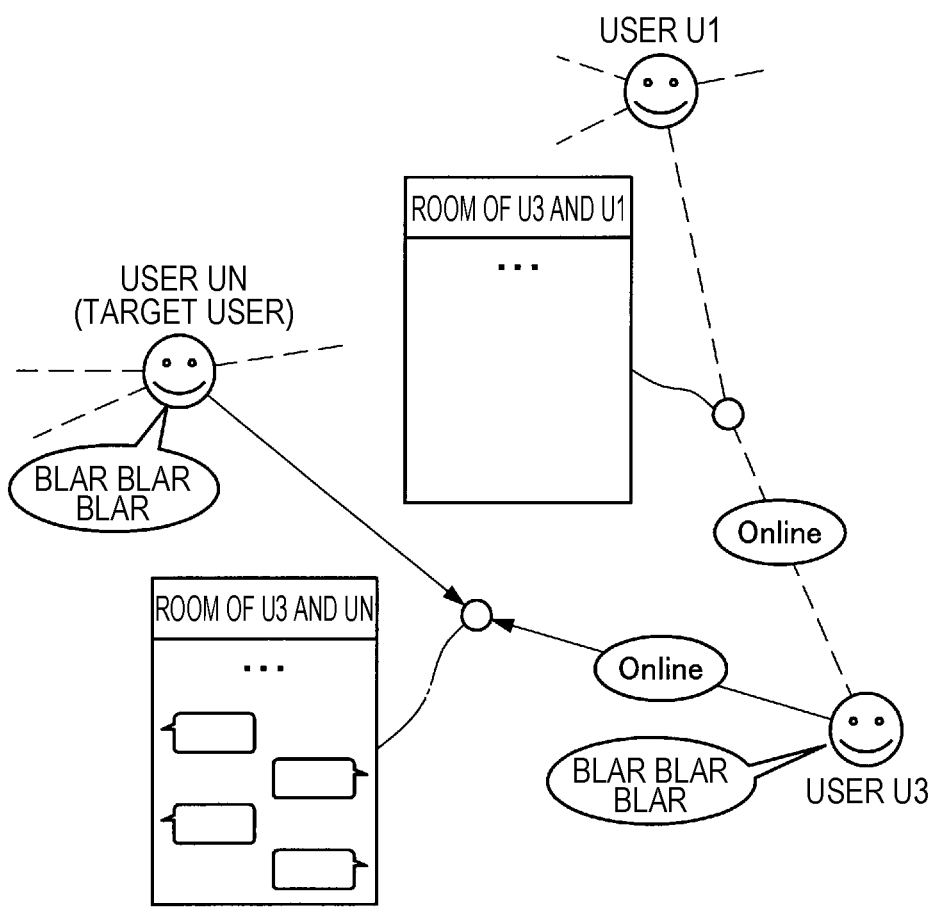
FIG. 6 is a diagram illustrating an example of human relationship based on a user who is a target of behavior recognition.

FIG. 6 is a diagram illustrating an example of human relationship based on the user U3 (who is a target of behavior recognition). Referring to FIG. 6, the terminal 70-3 of the user U3 is connected online to the terminal 70-N of the user UN, and the user UN is designated as a target user. Therefore, at the terminal 70-3 of the user U3, sound information detected by the detecting unit 710 of the terminal 70-N of the target user (user UN), an image corresponding to the target user (user UN), or the like, are output by the output unit 760.

While the terminal 70-3 of the user U3 is connected online to the terminal 70-1 of the user U1, the terminal 70-3 is not designated as the target user. Note that selection operation for selecting the target user is not particularly limited. For example, in the case where the detecting unit 710 includes a touch panel, the target user can be switched between the user U1 and the user UN through flick operation (for example, flick operation in a horizontal direction or in a vertical direction) with respect to the touch panel. In this event, each screen may be output in association with operation (such as blinking and change of emission color of an LED of the terminal 70-3) according to a degree of interest of the target user with respect to the user U1 (for example, relevance corresponding to combination of the first user=target user, the second user=user U1 in the human relationship DB 40).

Figure 7:
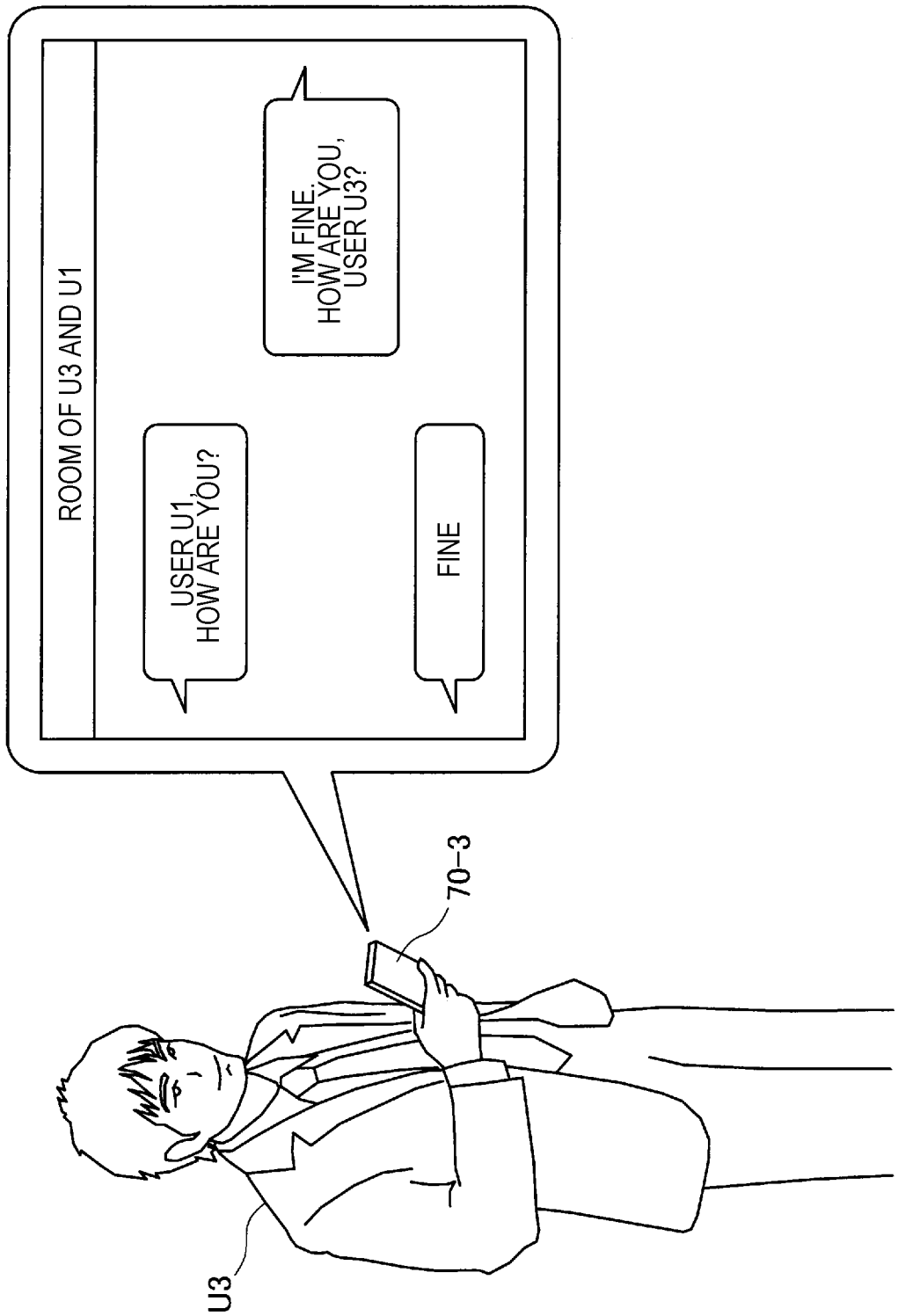
FIG. 7 is a diagram for explaining the first behavior recognition example.

FIG. 7 is a diagram for explaining the first behavior recognition example. As illustrated in FIG. 7, a case will be assumed where the user U3 performs communication with the user U1 using the terminal 70-3. The output unit 760 of the terminal 70-3 displays communication content such as "User U1, how are you?", "I'm fine. How are you, user U3?" and "Fine". These communication content is accumulated in the external server 80.

Subsequently, the analyzing apparatus 22 acquires communication content of the user U3 from the external server 80 and analyzes the communication content. In the case where the user U1 is specified as a current communication partner of the user U3 as a result of analysis of the communication content, at the information processing apparatus 10, the selecting unit 131 selects the user UN based on the user U1. More specifically, the selecting unit 131 only has to select the user UN having the highest relevance with the user U1 who is the current communication partner of the user U3 (see FIG. 5).

Then, the notifying unit 132 notifies the terminal 70-N of the user UN of predetermined notification information. Here, the notification information may be an instruction for causing the terminal 70-N to execute predetermined operation. The predetermined operation may be operation for vibrating the terminal 70-N or operation for causing the LED of the terminal 70-N to blink. In this event, the operation to be executed by the terminal 70-N may be always the same or may change according to conditions. Therefore, the notification information may include designation of the operation to be executed by the terminal 70-N.

For example, the notifying unit 132 may determine notification information to be notified to the terminal 70-N of the user UN based on the user UN (or a type of the user UN). By this means, the user U3 can change the notification information according to the user UN (or a type of the user UN). Note that, while the type of the user UN is not limited, for example, the type may be a group to which the user UN belongs (such as, for example, company and school). Further, a fact that the terminal 70-N of the user UN is notified of the notification information may be displayed by the terminal 70-3 of the user U3 to inform the user U3.

Figure 8:
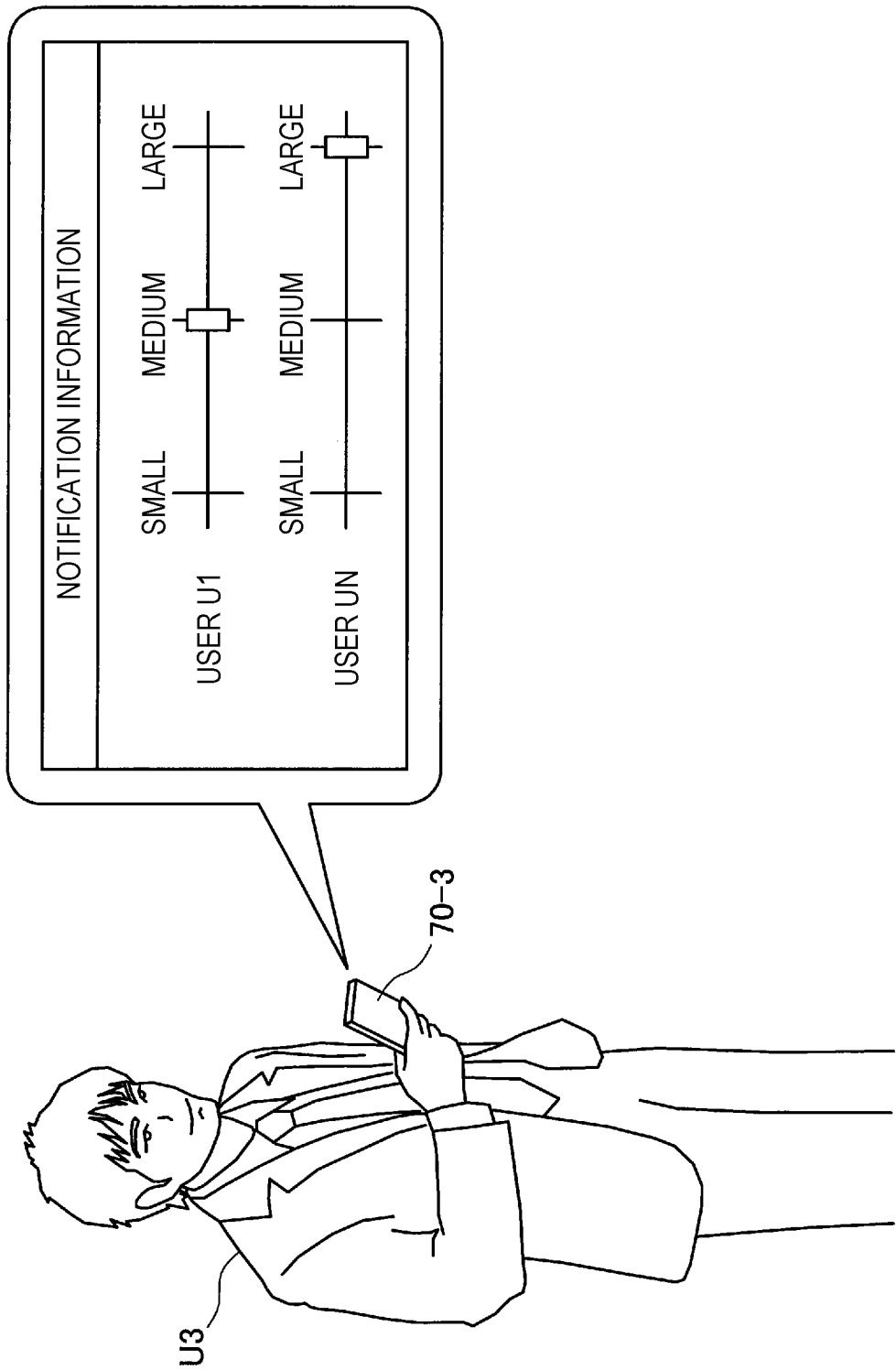
FIG. 8 is a diagram illustrating an example of association between the user and notification information.

FIG. 8 is a diagram illustrating an example of association between the user U1 and the user UN, and the notification information. For example, the relevance controlling unit 132 controls association between the user UN (or a type of the user UN) and the notification information based on predetermined operation by the user U3, and the associating unit 133 may be capable of performing association according to the control. In this event, for example, as illustrated in FIG. 8, notification information to be associated with the user UN (or a type of the user UN) may be able to be changed through operation of moving a thumb of a slider. In a similar manner, as illustrated in FIG. 8, the notifying unit 132 may be able to associate the user U1 (or a type of the user U1) with the notification information based on association operation.

Note that, in a similar manner to the association between the user (or a type of the user) and the notification information, it is also possible to associate various kinds of information with the notification information through association operation. Further, in the example illustrated in FIG. 8, as the notification information, vibration strength in the case where the terminal 70 is made to vibrate is indicated with "small", "medium" and "large". However, the notification information is not limited to this example. For example, as the notification information, blink speed in the case where the LED of the terminal 70 is made to blink may be indicated with "slow", "medium", "fast". Further, a level of the vibration strength or the blink speed does not have to be indicated with three stages, and may be indicated with two stages or four or more stages.

Figure 9:
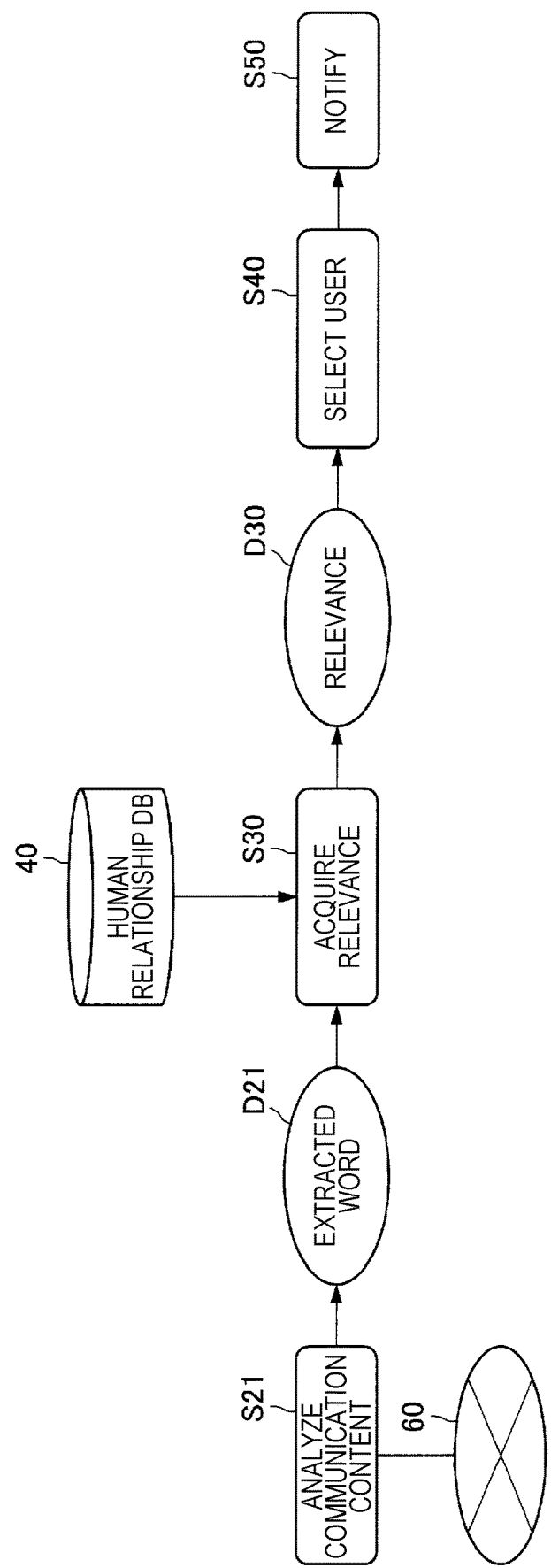
FIG. 9 is a diagram illustrating flow of operation of the information processing apparatus according to the first behavior recognition example.

Subsequently, flow of operation from analysis of the communication content to notification of the notification information will be described. FIG. 9 is a diagram illustrating flow of operation of the information processing apparatus 10 according to the first behavior recognition example. Note that, because the flowchart in FIG. 9 is merely an example of the flow of the operation of the information processing apparatus 10 according to the first behavior recognition example, the flow of the operation of the information processing apparatus 10 according to the first behavior recognition example is not limited to the example illustrated in the flowchart in FIG. 9.

As illustrated in FIG. 9, the analyzing apparatus 22 acquires communication content of the user U3 and analyzes the communication content. In the case where a current communication partner (user U1) of the user U3 is specified as an example of the extracted information D21 as a result of analysis of the communication content, at the information processing apparatus 10, the selecting unit 131 acquires relevance D30 associated with the user U1 who is the current communication partner of the user U3 from the human relationship DB 40 (S30).

Subsequently, the selecting unit 131 selects the user UN based on the relevance D30. More specifically, the selecting unit 131 only has to select the user UN having highest relevance with the user U1 who is the current communication partner of the user U3. Then, the notifying unit 132 notifies the terminal 70-N of the user UN selected by the selecting unit 131 of the notification information (S50). The output unit 760 of the terminal 70-N outputs the notification information.

Figure 10:
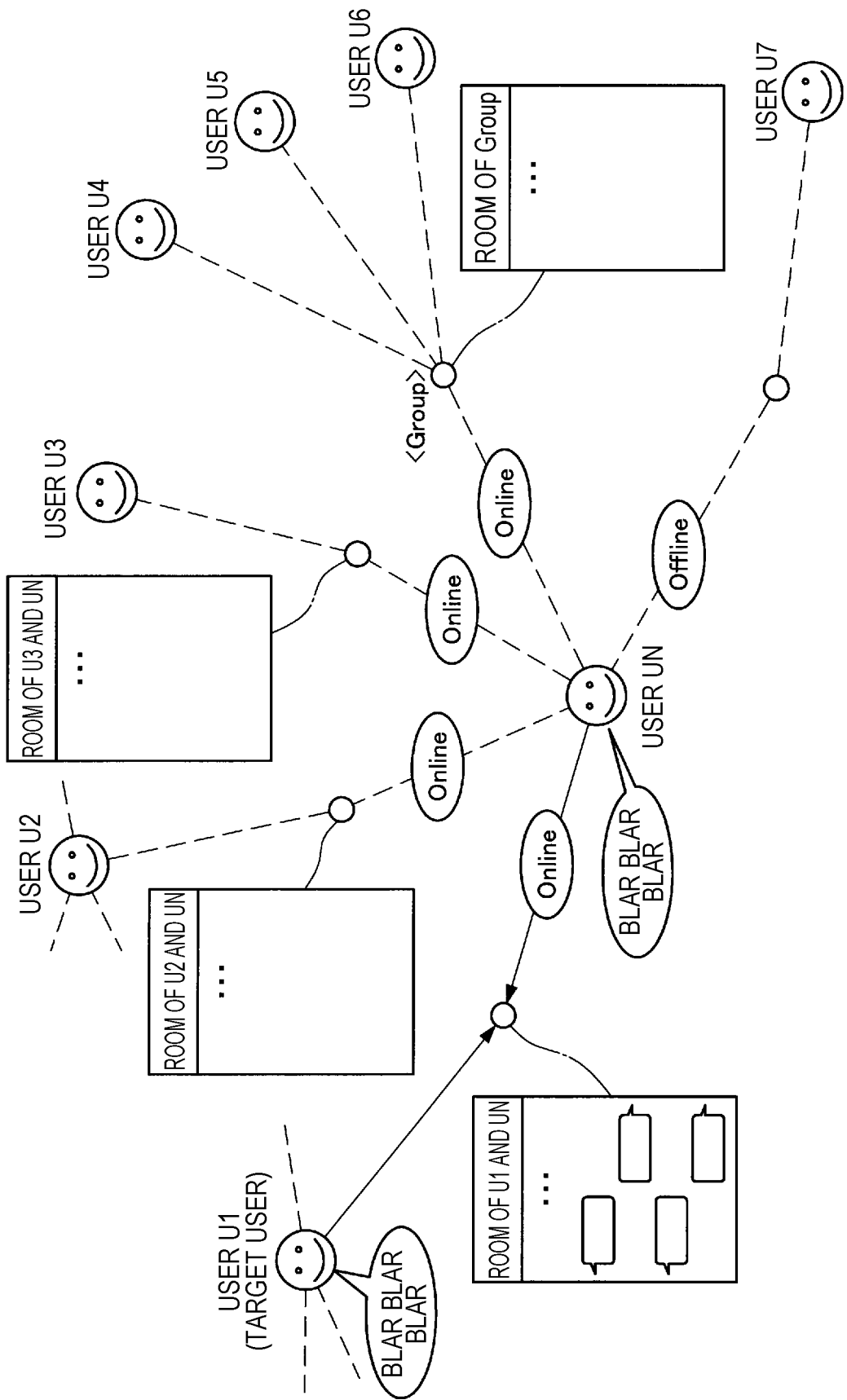
FIG. 10 is a diagram illustrating an example of human relationship based on a reception side user.

Subsequently, the user UN (notification information reception side user) will be described. FIG. 10 is a diagram illustrating an example of human relationship based on the user UN (notification information reception side user). Referring to FIG. 10, the terminal 70-N of the user UN is connected online to the terminal 70-1 of the user U1, and the user U1 is designated as the target user. Therefore, at the terminal 70-N of the user UN, sound information detected by the detecting unit 710 of the terminal 70-1 of the target user (user U1), an image corresponding to the target user (user U1), or the like, are output by the output unit 760.

While the terminal 70-2 of the user U2 is connected online to the terminal 70-N of the user UN, the user U2 is not designated as the target user. In a similar manner, while the terminal 70-3 of the user U3 is connected online to the terminal 70-N of the user UN, the user U3 is not designated as the target user. Further, while the terminal 70 of a group including the user U4, the user U5 and the user U6 is connected online to the terminal 70-N of the user UN, this group is not designated as the target user. The terminal 70-7 of the user U7 is not connected online to the terminal 70-N of the user UN (is offline with respect to the terminal 70-N of the user UN).

Figure 11:
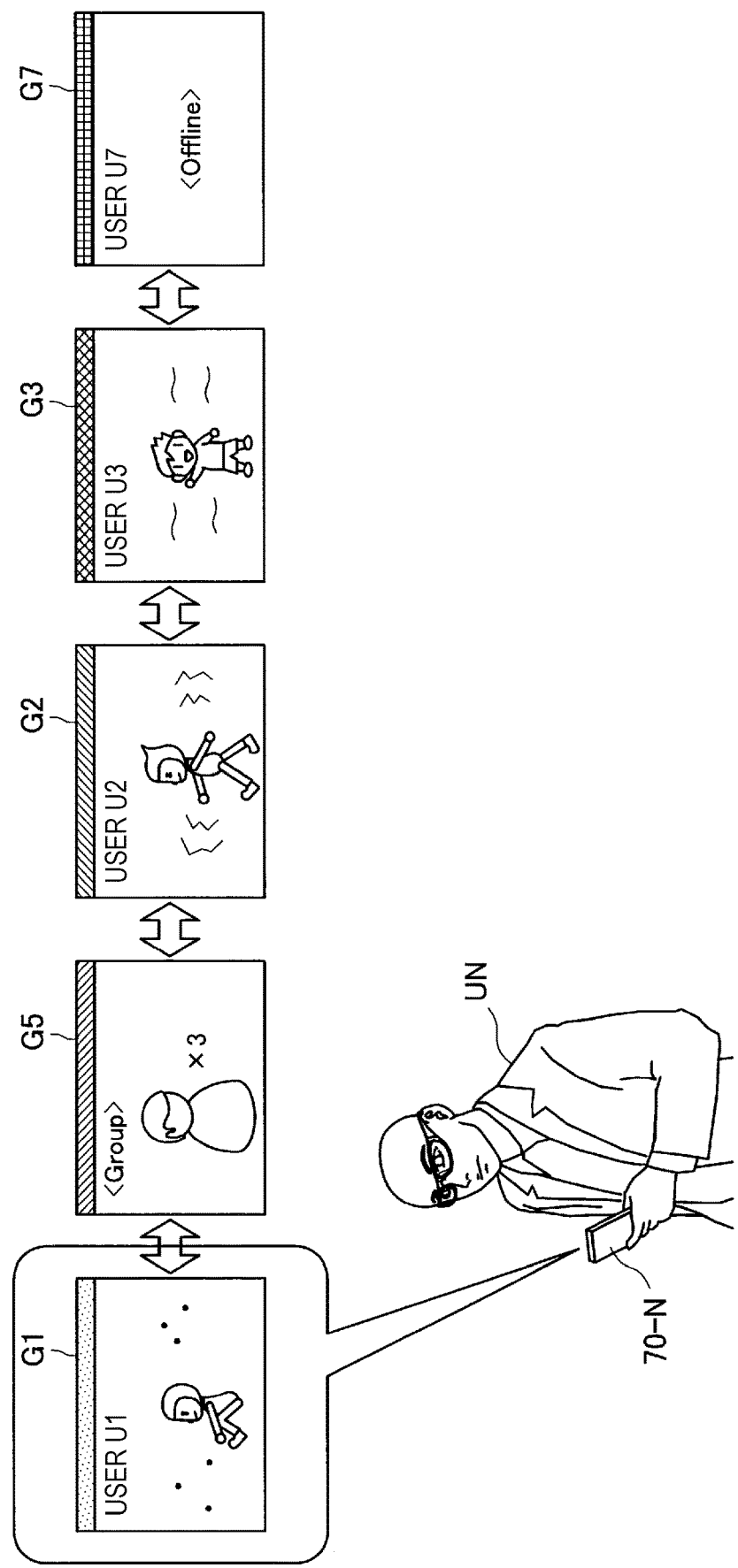
FIG. 11 is a diagram illustrating an example of a screen displayed by a terminal of the reception side user before notification of the notification information is made.

FIG. 11 is a diagram illustrating an example of a screen displayed by the terminal 70-N of the user UN (reception side user) before notification of the notification information is made. As illustrated in FIG. 11, the user U1 is designated as the target user. Therefore, at the terminal 70-N of the user UN, sound information detected by the detecting unit 710 of the terminal 70-1 of the target user (user U1) is output by the output unit 760, and an image (such as, for example, an avatar) corresponding to the target user (user U1) is output as a screen G1 by the output unit 760.

The target user can be selected through selection operation. For example, in the case where the detecting unit 710 includes a touch panel, the target user can be switched through flick operation (for example, flick operation in a horizontal direction or in a vertical direction) with respect to the touch panel. FIG. 11 illustrates an example where, in the case where the target user is sequentially switched to the user U1, the group, the user U2, the user U3 and the user U7 in this order, a screen to be output by the output unit 760 of the terminal 70-N is sequentially switched to a screen G1, a screen G5, a screen G2, a screen G3 and a screen G7 in this order. In this event, each screen may be output in association with operation (such as blinking and change of emission color of the LED of the terminal 70-N) according to a degree of interest of the target user with respect to the user UN (for example, relevance corresponding to combination of the first user=target user, the second user=user UN in the human relationship DB 40).

Figure 12:
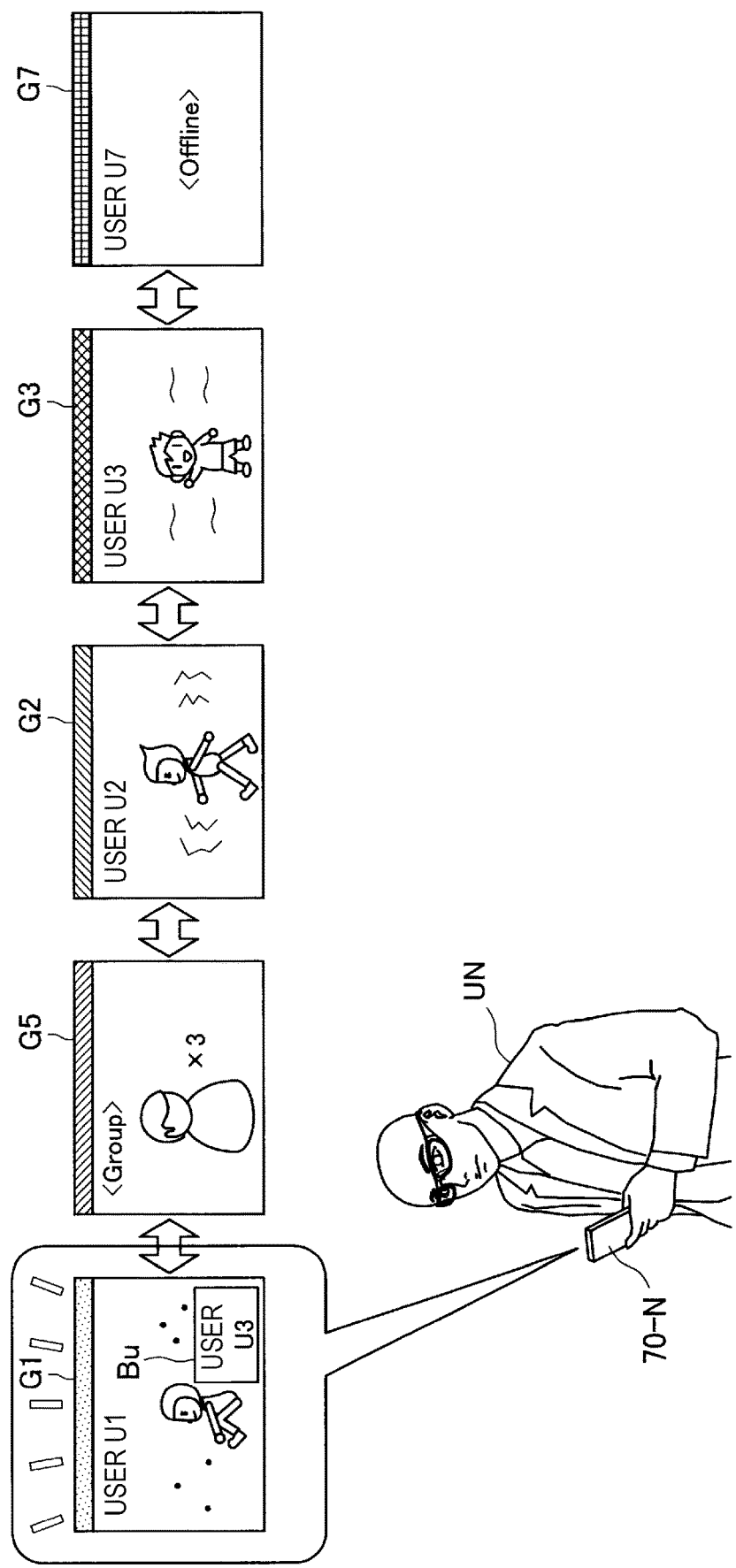
FIG. 12 is a diagram illustrating an example of a screen displayed by the terminal of the reception side user in the case where notification of the notification information is made.

FIG. 12 is a diagram illustrating an example of a screen displayed by the terminal 70-N of the user UN (reception side user) in the case where notification of the notification information is made. As illustrated in FIG. 12, in the case where the user U1 is selected as the target user, the output unit 760 displays the screen G1 at the terminal 70-N of the user UN. Here, the terminal 70-N executes predetermined operation when the terminal 70-N is notified of the notification information. While FIG. 12 illustrates an example where the LED of the terminal 70-N is made to blink as the predetermined operation, the predetermined operation is not limited to this example as described above. For example, the predetermined operation may be operation for changing emission color emitted by the LED of the terminal 70-N.

Note that a vibrating pattern or a vibrating portion (or a blink pattern of the LED or a blinking portion) of the terminal 70-N is preferably different between the case where notification of the notification information is made from the target user and the case where notification of the notification information is made from a user other than the target user. By this means, the user UN can easily recognize whether notification of the notification information is made from the target user or notification of the notification information is made from a user other than the target user.

In the example illustrated in FIG. 12, the output unit 760 of the terminal 70-N displays a selection object Bu for selecting the user U3 as the target user. Therefore, the output unit 760 of the terminal 70-N can switch the target user from the user U1 to the user U3 by the user UN performing operation of selecting the selection object Bu. In the case where the input unit 720 is configured with a touch panel, the operation of selecting the selection object Bu can correspond to tap operation with respect to the touch panel.

Note that FIG. 11 illustrates the screen G1, the screen G5, the screen G2, the screen G3 and the screen G7 in this order from left to right, and illustrates an example where this order never changes. However, the order of the screens is not particularly limited. For example, the screens may be arranged in order from a screen corresponding to a user who notifies the terminal 70-N of the notification information at the latest timing in a predetermined direction (for example, from right to left or from top to bottom). Alternatively, the screens may be arranged in order from a screen corresponding to a user who is notified of the notification information at the latest timing based on the result of behavior recognition of the user UN in a predetermined direction (for example, from right to left or from top to bottom). Alternatively, the screens may be arranged in order from a screen corresponding to a user who is designated as the target user by the user UN at the latest timing in a predetermined direction (for example, from right to left or from top to bottom).

As described above, the user UN who is a user at the notification information reception side can recognize that the user UN is selected based on the result of behavior recognition with respect to the user U3. Therefore, the user UN who is the user at the notification information reception side can lower a psychological barrier to perform communication with the user U3 who is a target of behavior recognition.

Note that the notification information may include information indicating the result of behavior recognition with respect to the user U3. The output unit 760 of the terminal 70-N may output the result of behavior recognition. The result of behavior recognition may be output in any form and may be output as sound information or as a character string. Because the user UN can recognize the reason why notification of the notification information is made by perceiving the result of behavior recognition output in this manner, the user UN can further lower a psychological barrier to perform communication with the user U3 who is a target of behavior recognition.

Further, user selection by the selecting unit 131 and notification of the notification information by the notifying unit 132 are not limited to the above-described examples. For example, the selecting unit 131 may select a user based on information perceived by the user U3 in predetermined service (such as, for example, external application and external communication service). More specifically, the selecting unit 131 only has to select the user UN in the case where a page displayed by the output unit 760 of the terminal 70-3 is a page relevant to the user UN (such as, for example, a page of a blog of the user UN).

Further, the selecting unit 131 may select a user based on a communication period or communication frequency with the user U3. More specifically, the selecting unit 131 only has to select the user UN in the case where the user U3 communicates with the user UN for the longest communication period or with the highest frequency (or the communication period or the communication frequency with the user UN exceeds a threshold) in predetermined service (such as, for example, external application and external communication service). The communication frequency may be the number of times of communication within a predetermined period or may be a cumulative number of times of communication until now.

Further, a user to be a target of notification of information may be selected based on a result of behavior recognition with respect to another user different from the user U3. For example, a case is assumed where there are a plurality of users selected based on the result of behavior recognition with respect to the user U3. In such a case, the selecting unit 131 may select one user based on respective results of behavior recognition with respect to the selected plurality of users. For example, in the case where there exists a user who selects the user U3 based on the result of behavior recognition among the selected plurality of users, the selecting unit 131 only has to select the user. By this means, users who select each other based on the results of behavior recognition are regarded as users with strong connection.

Further, while an example has been described above where the terminal 70-N of the user UN is notified of the notification information according to the user UN (or a type of the user UN), the notification information may be determined based on time at which behavior is recognized, because there can be also a case where it is desired to change the notification information according to time at which behavior is recognized. For example, the notifying unit 132 may notify the terminal 70-N of the user UN of notification information different between the case where time at which behavior is recognized falls within a predetermined first time slot and the case where the time falls within a predetermined second time slot.

Further, the notification information may be determined based on relevance between the user U3 and the user UN. For example, the notification information may include designation of operation for causing vibration at larger vibration strength as relevance between the user U3 and the user UN is larger in the human relationship DB 40. Alternatively, the notification information may include designation of operation for causing the LED to blink in a quicker blink pattern as relevance between the user U3 and the user UN is larger in the human relationship DB 40.

Further, the notification information may be determined based on relationship between the result of behavior recognition with respect to the user U3 and a result of behavior recognition with respect to the user UN. For example, the notification information may include designation of operation for causing vibration with larger vibration strength as similarity between the result of behavior recognition with respect to the user U3 and the result of behavior recognition with respect to the user UN is higher. Alternatively, the notification information may include designation of operation for causing the LED to blink in a quicker blink pattern as similarity between the result of behavior recognition with respect to the user U3 and the result of behavior recognition with respect to the user UN is higher.

Further, the notification information may restrict notification to the terminal 70-N of the user UN in the case where a type of behavior recognition is a predetermined type. For example, in the case where behavior is recognized by extracting a word from collected sound data, the notifying unit 132 may restrict notification of the notification information to the terminal 70-N of the user UN. Alternatively, in the case where behavior is recognized by recognizing an object from a picked up image, the notifying unit 132 may restrict notification of the notification information to the terminal 70-N of the user UN. Behavior recognition which restricts notification of the notification information may be able to be set by the user U3.

Further, notification of the notification information may be restricted based on sensing data detected by the detecting unit 710 of the terminal 70-3. For example, in the case where the terminal 70-3 is grasped by the user U3, the notifying unit 132 may restrict notification of the notification information to all users. Whether or not the terminal 70-3 is grasped by the user U3 may be judged by, for example, judging whether or not illuminance detected by an illuminance sensor falls below a threshold.

Further, for example, the notifying unit 132 may withdraw restriction of notification to all users in the case where the terminal 70-3 is shaken by the user U3. Whether or not the terminal 70-3 is shaken by the user U3 may be judged by, for example, judging whether or not acceleration detected by an acceleration sensor satisfies predetermined conditions or judging by whether or not angular velocity detected by a gyro sensor satisfies predetermined conditions. Note that restriction of notification of the notification information may be prohibition of the notification information.

[1.5. Details of Function (Recognition of User State)]

Subsequently, an example will be described where recognition of a state of the first user is used as a second example of behavior recognition with respect to the first user. Also in the following description, at the information processing apparatus 10, the selecting unit 131 selects the user UN based on the result of behavior recognition with respect to the user U3, and the notifying unit 132 notifies the terminal 70-N of the user UN of predetermined notification information. However, a user who is a target of behavior recognition is not limited to the user U3. Further, the notification information reception side user is not limited to the user UN.

FIG. 13 is a diagram illustrating a data configuration example of the correspondence relationship DB 50 according to the second behavior recognition example. As illustrated in FIG. 13, combination of a target other than the users U1 to UN and relevance between the target and the user is registered in the correspondence relationship DB 50. In the example illustrated in FIG. 13, as combination of (target, user, relevance), (office, user U1, −0.2), (office, user UN, +0.7), (football ground, user U1, +0.0) and (football ground, user UN, +0.6) are registered.

Figure 14:
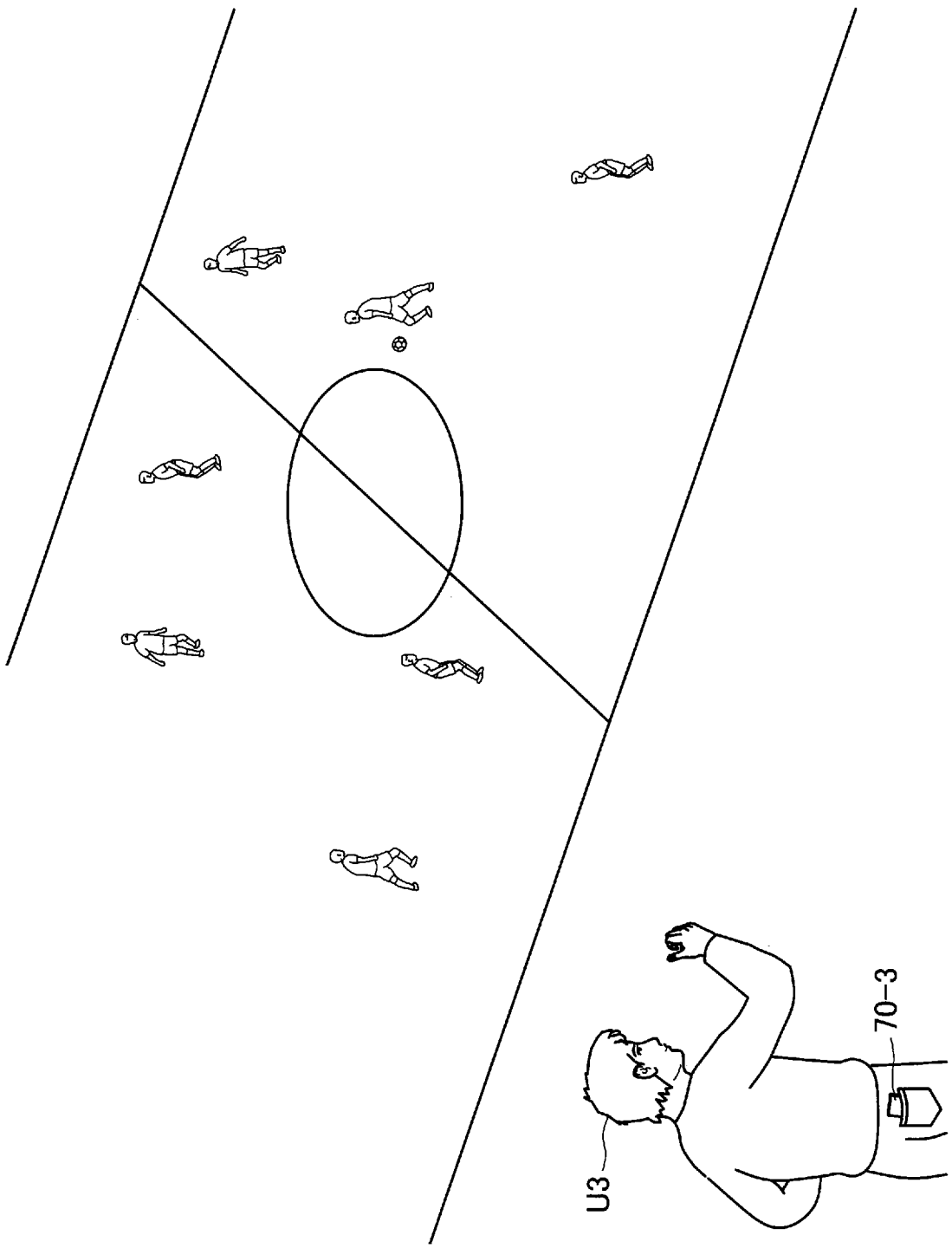
FIG. 14 is a diagram for explaining the second behavior recognition example.

An example of human relationship based on the user U3 (who is a target of behavior recognition) is as illustrated in FIG. 6. FIG. 14 is a diagram illustrating the second behavior recognition example. Here, a case is assumed where the user U3 is located at a predetermined location in a state where the user U3 wears the terminal 70-3. In the example illustrated in FIG. 14, an example where the user U3 watches a football game at a football ground is illustrated. Note that, while it is assumed in the example illustrated in FIG. 14 that the predetermined location is the football ground, the predetermined location is not particularly limited.

Subsequently, the recognizing apparatus 21 recognizes a state of the user U3. When the state of the user U3 is recognized, at the information processing apparatus 10, the selecting unit 131 selects the user UN based on the state of the user U3. For example, in the case where the terminal 70-3 acquires location information of the user U3 as sensing data, the selecting unit 131 selects the user UN based on the location information of the user U3. More specifically, the selecting unit 131 only has to acquire a target (for example, a football ground) corresponding to the location information of the user U3 from the location information DB 30 and select the user UN having the highest relevance with the target.

The notifying unit 132 then notifies the terminal 70-N of the user UN of predetermined notification information. Here, the notification information used in the second behavior recognition example may be dealt with in a similar manner to the notification information described in the first behavior recognition example. Therefore, detailed description of the notification information used in the second behavior recognition example will be omitted.

Figure 15:
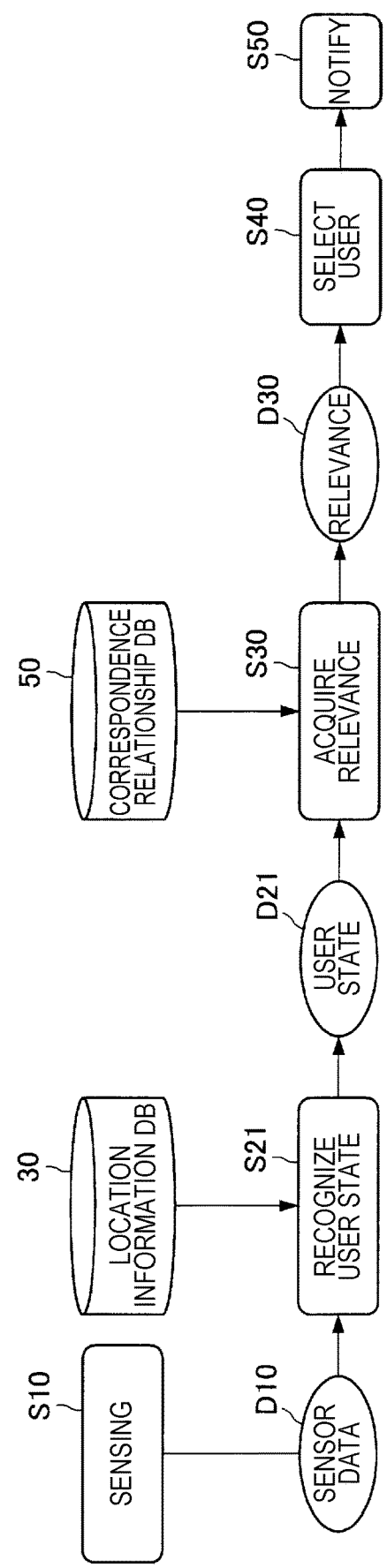
FIG. 15 is a diagram illustrating flow of operation of the information processing apparatus according to the second behavior recognition example.

Subsequently, flow of operation from recognition of the user state to notification of the notification information will be described. FIG. 15 is a diagram illustrating the flow of the operation of the information processing apparatus 10 according to the second behavior recognition example. Note that, because the flowchart in FIG. 15 is merely an example of the flow of the operation of the information processing apparatus 10 according to the second behavior recognition example, the flow of the operation of the information processing apparatus 10 according to the second behavior recognition example is not limited to the example illustrated in the flowchart of FIG. 15.

As illustrated in FIG. 15, the recognizing apparatus 21 acquires sensing data D10 (for example, location information of the user U3) obtained as a result of sensing (S10) by the terminal 70-3. The recognizing apparatus 21 then obtains a state of the user U3 based on the sensing data D10 (S21). For example, the recognizing apparatus 21 acquires a target (for example, a football ground) associated with the location information of the user U3 in the location information DB 30 as the state of the user U3.

At the information processing apparatus 10, the selecting unit 131 acquires relevance D30 associated with the state of the user U3 from the correspondence relationship DB 50 (S30). Subsequently, the selecting unit 131 selects the user UN based on the relevance D30. More specifically, the selecting unit 131 only has to select a user UN having the highest relevance with the state (for example, a football ground) of the user U3. Subsequently, the notifying unit 132 notifies the terminal 70-N of the user UN selected by the selecting unit 131 of the notification information (S50).

The output unit 760 of the terminal 70-N outputs the notification information. The notification information may be output by the terminal 70-N in the second behavior recognition example in a similar manner to output of the notification information described in the first behavior recognition example. Therefore, detailed description of output of the notification information by the terminal 70-N in the second behavior recognition example will be omitted.

Further, selection of a user by the selecting unit 131 and notification of the notification information by the notifying unit 132 are not limited to the above-described examples. For example, the selecting unit 131 may select a user based on an event the user U3 participates in. More specifically, in the case where the user U3 participates in an event, the selecting unit 131 only has to select another user who participates in the event. Note that whether or not the user participates in an event may be judged by acquiring a location corresponding to location information of the user from the location information DB 30 and judging whether or not the acquired location is an event site from information of an event to be held for each location.

Further, the notification information may be determined based on a surrounding situation or location information of the user U3. For example, the notifying unit 132 acquires the surrounding situation of the user U3, and, in the case where another user is associated with the surrounding situation in the correspondence relationship DB 50, the another user can be selected. For example, the surrounding situation may be a type of scenery such as a school building, a library, station, a store, facility, a building and office. For example, the surrounding situation may be obtained by scenery recognition based on a picked up image.

Further, for example, the notifying unit 132 acquires the location information of the user U3 and acquires a location corresponding to the location information of the user U3 from the location information DB 30, and, in the case where the location is associated with another user in the correspondence relationship DB 50, the another user can be selected.

Further, the selecting unit 131 may select a user based on content browsed by the user U3. More specifically, in the case where the same content as content displayed by the output unit 760 of the terminal 70-3 is displayed at the output unit 760 of the terminal 70-N, the selecting unit 131 only has to select the user UN. A type of the content is not particularly limited. For example, the content may be a still image, a moving image or a web page.

Further, the selecting unit 131 may select a user based on an object recognized from a picked up image picked up by the terminal 70-3. More specifically, in the case where a user UN is associated with an object recognized from a picked up image detected by the detecting unit 710 of the terminal 70-3, the selecting unit 131 only has to select the user UN. A method for recognizing an object is not particularly limited. Further, an object may be recognized by the information processing apparatus 10 or may be recognized by the terminal 70-3.

Further, the selecting unit 131 may select a user based on a word (such as, for example, a noun) extracted from collected sound data by the terminal 70-3 of the user U3. More specifically, in the case where a user UN is associated with a word extracted from collected sound data detected by the detecting unit 710 of the terminal 70-3 in the human relationship DB or the correspondence relationship DB 50, the selecting unit 131 only has to select the user UN. Note that the collected sound data may be data of sound collected when the user U3 has a conversation with a partner face-to-face or has a conversation with a remote partner.

Figure 16:
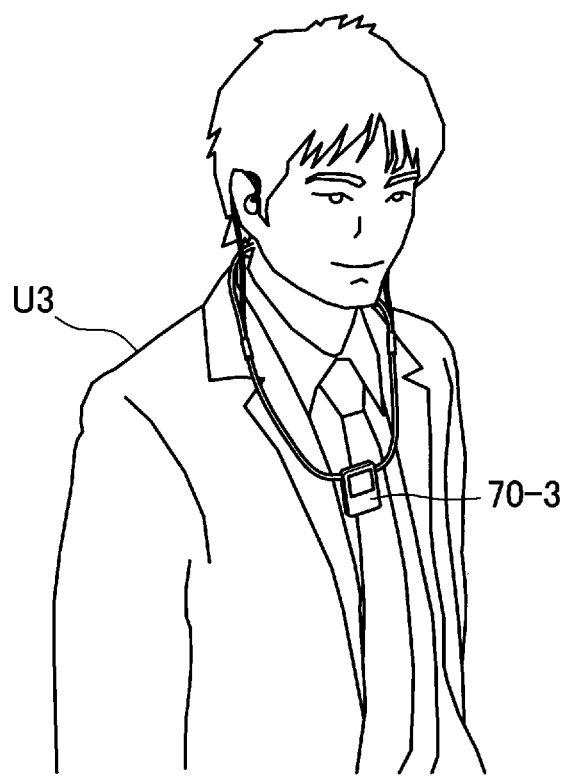
FIG. 16 is a diagram illustrating an example where a terminal is implemented with a pendant type device.

While an example where the terminal 70 is implemented with a smartphone has been mainly described above, as described above, the terminal 70 may be implemented with a wearable device. For example, the terminal 70 may be implemented with a pendant type device worn by being dangled from the neck of the user. FIG. 16 is a diagram illustrating an example where the terminal 70 is implemented with the pendant type device. In the example illustrated in FIG. 16, the user U3 wears the terminal 70-3 so as to dangle the terminal 70-3 from the neck. Note that the wearable device may be a wristband type device worn around the arm of the user, a head mount display (HMD) or a key holder attached to belongings of the user.

The details of the functions of the information processing system 1 according to the embodiment of the present disclosure have been described above.

[1.6. Hardware Configuration Example]

Figure 17:
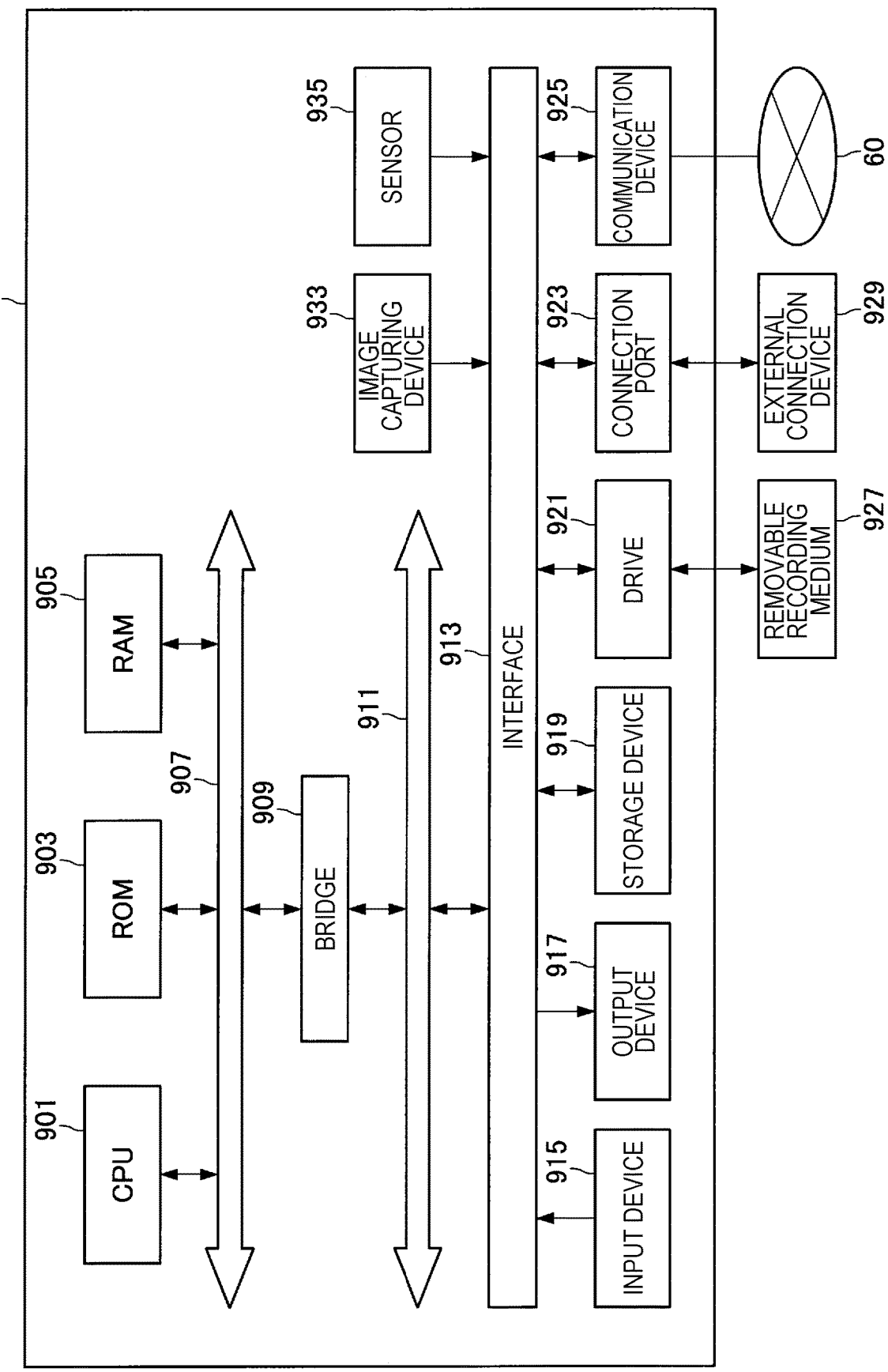
FIG. 17 is a block diagram illustrating a hardware configuration example of the information processing apparatus.

The hardware configuration of the information processing apparatus 10 according to the embodiment of the present disclosure is now described with reference to FIG. 17. FIG. 17 is a block diagram illustrating a hardware configuration example of the information processing apparatus 10 according to the embodiment of the present disclosure.

As illustrated in FIG. 17, the information processing apparatus 10 includes a central processing unit (CPU) 901, a read only memory (ROM) 903, and a random access memory (RAM) 905. In addition, the information processing apparatus 10 may include a host bus 907, a bridge 909, an external bus 911, an interface 913, an input device 915, an output device 917, a storage device 919, a drive 921, a connection port 923, and a communication device 925. The information processing apparatus 10 may further include an image capturing device 933 and a sensor 935 as necessary. In conjunction with, or in place of, the CPU 901, the information processing apparatus 10 may have a processing circuit called a digital signal processor (DSP) or application specific integrated circuit (ASIC).

The CPU 901 functions as an arithmetic processing unit and a control device, and controls the overall operation in the information processing apparatus 10 or a part thereof in accordance with various programs recorded in the ROM 903, the RAM 905, the storage device 919, or the removable recording medium 927. The ROM 903 stores, for example, programs and operation parameters used by the CPU 901. The RAM 905 temporarily stores, for example, programs to be used in the execution by the CPU 901 and parameters that change as appropriate in executing the programs. The CPU 901, the ROM 903, and the RAM 905 are connected with each other via a host bus 907 that is composed of an internal bus such as a CPU bus. Furthermore, the host bus 907 is connected to an external bus 911 such as peripheral component interconnect (PCI)/interface bus via a bridge 909.

The input device 915 is, for example, a device operated by a user, such as a mouse, a keyboard, a touch panel, a button, a switch, and a lever. The input device 915 may include a microphone for detecting user's voice. The input device 915 may be, for example, a remote control device using infrared rays or other radio waves, or may be an external connection device 929 such as a cellular phone conforming to the operation of the information processing apparatus 10. The input device 915 includes an input control circuit that generates an input signal on the basis of the information input by the user and outputs it to the CPU 901. The user inputs various data to the information processing apparatus 10 and instructs the information processing system 10 to perform a processing operation by operating the input device 915. In addition, the image capturing device 933, which will be described later, can also function as an input device by capturing the movement of the user's hand or finger, and the like. In this case, the pointing position may be determined depending on the motion of the hand or the orientation of the finger.

The output device 917 is composed of a device capable of notifying visually or audibly the user of the acquired information. The output device 917 may be a display device such as a liquid crystal display (LCD), a plasma display panel (PDP), an organic electro-luminescence (EL) display, and a projector, a hologram display device, an audio output device such as a speaker and a headphone, as well as printer devices or the like. The output device 917 outputs the result obtained by the processing of the information processing apparatus 10 as a video such as a text or an image, or outputs it as audio such as a voice or sound. In addition, the output device 917 may include, for example, a light for lighting up the surroundings.

The storage device 919 is a data storage device configured as an example of a storage portion of the information processing apparatus 10. The storage device 919 is composed of, for example, a magnetic storage device such as hard disk drives (HDDs), a semiconductor storage device, an optical storage device, and a magneto-optical storage device. The storage device 919 stores programs executed by the CPU 901, various data, various types of data obtained from the outside, and the like.

The drive 921 is a reader-writer for a removable recording medium 927 such as a magnetic disk, an optical disk, a magneto-optical disk, and a semiconductor memory, and is incorporated in the information processing apparatus 10 or externally attached thereto. The drive 921 reads the information recorded in the attached removable recording medium 927 and outputs it to the RAM 905. In addition, the drive 921 writes in the attached removable recording medium 927.

The connection port 923 is a port for directly connecting the device to the information processing apparatus 10. The connection port 923 may be, for example, a universal serial bus (USB) port, an IEEE 1394 port, or a small computer system interface (SCSI) port. In addition, the connection port 923 may be, for example, an RS-232C port, an optical audio terminal, or high-definition multimedia interface (HDMI, registered trademark) port. The external connection device 929 is connected to the connection port 923, and thus various kinds of data can be exchanged between the information processing apparatus 10 and the external connection device 929.

The communication device 925 is, for example, a communication interface composed of a communication device or the like, which is used to be connected to the communication network 60. The communication device 925 may be, for example, a communication card for wired or wireless local area network (LAN), Bluetooth (registered trademark), or wireless USB (WUSB). In addition, the communication device 925 may be, for example, a router for optical communication, a router for asymmetric digital subscriber line (ADSL), or a modem for various communications. The communication device 925 transmits and receives signals or the like using a predetermined protocol such as TCP/IP, for example, with the Internet or other communication devices. In addition, the communication network 60 connected to the communication device 925 is a network connected by wire or wireless, and is, for example, the Internet, home LAN, infrared communication, radio wave communication, satellite communication, or the like.

The image capturing device 933 captures a real space and generates a captured image, by using an image sensor such as charge-coupled device (CCD) or complementary-metal-oxide semiconductor (CMOS) and various members such as a lens for controlling imaging of a subject image on the image sensor. The image capturing device 933 may capture a still image or a moving image.

The sensor 935 is, for example, various sensors such as an accelerometer, a gyro sensor, a geomagnetic sensor, a photosensor, and a sound sensor. The sensor 935 acquires information on the state of the information processing apparatus 10 itself, such as the attitude of the casing of the information processing apparatus 10, and information on the surrounding environment of the information processing apparatus 10 such as brightness or noise around the information processing apparatus 10. The sensor 935 may also include a GPS sensor, which receives global positioning system (GPS) signals and measures the latitude, longitude, and altitude of the device.

The above description is given as to the example of the hardware configuration of the information processing apparatus 10. Each of the components described above may be configured using a general-purpose member, or may be configured with hardware dedicated to the function of each component. Such a configuration can be changed appropriately depending on the technical level at the time of implementation.

2. Conclusion

As described above, according to the embodiment of the present disclosure, an information processing apparatus 10 including a selecting unit 131 configured to select a second user based on a result of behavior recognition with respect to a first user, and a notifying unit 132 configured to notify a terminal of the second user of predetermined notification information is provided. According to this configuration, by the second user perceiving the notification information notified from the information processing apparatus 10, it is possible to lower a psychological barrier of the second user to perform communication with the first user.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Furthermore, it is possible to create a program for causing the hardware such as CPU, ROM and RAM incorporated in the computer to execute functions equivalent to those of the information processing apparatus 10 as described above. In addition, a computer-readable recording medium on which the program is recorded can also be provided.

Note that positions of respective components are not particularly limited if the above-described operation of the information processing system 1 is realized. For example, while a case has been described in the above-described example where the information processing apparatus 10 functions as a server, each of the terminals 70-1 to 70-N may have part or all of the functions of the information processing apparatus 10. For example, each of the terminals 70-1 to 70-N may have the selecting unit 131 and the notifying unit 132. Further, part or all of the information processing apparatus 10, the recognizing apparatus 21 and the analyzing apparatus 22 may be incorporated into the same apparatus.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a selecting unit configured to select a second user to be a target of notification of information on the basis of a result of behavior recognition with respect to a first user.

(2)
The information processing apparatus according to (1), including:
a notification control unit configured to determine notification information to be notified to the second user selected by the selecting unit.

(3)
The information processing apparatus according to (2),
in which the notification control unit determines the notification information on the basis of the second user or a type of the second user.

(4)
The information processing apparatus according to (2) or (3), including:
a relevance control unit configured to associate the second user or a type of the second user with the notification information on the basis of predetermined operation performed by the first user.

(5)
The information processing apparatus according to any one of (2) to (4),
in which the notification information includes information indicating the result of behavior recognition.

(6)
The information processing apparatus according to any one of (2) to (5),
in which the notification information is determined on the basis of a surrounding situation or location information of the first user.

(7)
The information processing apparatus according to any one of (2) to (6),
in which the notification information is determined on the basis of time at which the behavior recognition is performed.

(8)
The information processing apparatus according to any one of (2) to (7),
in which the notification information is determined on the basis of a degree of relevance between the first user and the second user.

(9)
The information processing apparatus according to any one of (2) to (8),
in which the notification information is determined on the basis of relationship between the result of behavior recognition with respect to the first user and the result of behavior recognition with respect to the second user.

(10)
The information processing apparatus according to any one of (2) to (9),
in which notification of the notification information to the terminal of the second user is restricted in the case where a type of the behavior recognition is a predetermined type.

(11)
The information processing apparatus according to (1),
in which the selecting unit selects the second user on the basis of location information of the first user.

(12)
The information processing apparatus according to (1),
in which the selecting unit selects the second user on the basis of content browsed by the first user.

(13)
The information processing apparatus according to (1),
in which the selecting unit selects the second user on the basis of an event the first user participates in.

(14)
The information processing apparatus according to (1),
in which the selecting unit selects the second user on the basis of a communication period or communication frequency with the first user.

(15)
The information processing apparatus according to (1),
in which the selecting unit selects the second user on the basis of a current communication partner of the first user.

(16)
The information processing apparatus according to (1),
in which the selecting unit selects the second user on the basis of an object recognized from a picked up image picked up by a terminal of the first user.

(17)
The information processing apparatus according to (1),
in which the selecting unit selects the second user on the basis of a word extracted from collected sound data collected by a terminal of the first user.

(18)
The information processing apparatus according to (1),
in which the selecting unit selects the second user to be a target of notification of information on the basis of a result of behavior recognition with respect to another user different from the first user.

(19)
An information processing method including:
selecting a second user to be a target of notification of information on the basis of a result of behavior recognition with respect to a first user.

(20)
A program for causing a computer to function as an information processing apparatus including a selecting unit configured to select a second user to be a target of notification of information on the basis of a result of behavior recognition with respect to a first user.

(21)
The information processing apparatus according to one of the above-described (2) to (10),
in which the selecting unit selects the second user based on information perceived by the first user in predetermined service.

REFERENCE SIGNS LIST 1 information processing system
10 information processing apparatus
130 control unit
131 selecting unit
132 notifying unit
140 storage unit
150 communication unit
21 recognizing apparatus
22 analyzing apparatus
30 location information DB
40 human relationship DB
50 correspondence relationship DB
60 network
70 terminal
710 detecting unit
720 input unit
730 control unit
740 storage unit
750 communication unit
760 output unit
80 external server

The invention claimed is:

1. An information processing apparatus, comprising:
a processor configured to:
control reception of, via a communication network, communication content of a first user and a second user from a first terminal associated with the first user;
control reception of sensing data of at least one sensor of the first terminal via the communication network, wherein the sensing data comprises at least one of motion of the first terminal or image data captured by the first terminal;
analyze the communication content of the first user and the second user;
extract a word from the analyzed communication content;
select a third user based on the extracted word and a result of behavior recognition with respect to the first user;
determine notification information based on a type of the selected third user;
determine whether the notification information is to be transmitted to a second terminal in a case where the at least one of the motion of the first terminal or the image data satisfies a determined condition; and
control, based on the determination that the notification information is to be transmitted, transmission of the notification information to the second terminal, wherein
the second terminal is associated with the selected third user, and
the notification information comprises a designation of a determined operation at the second terminal based on a degree of similarity between the result of the behavior recognition with respect to the first user and a result of behavior recognition with respect to the selected third user.

2. The information processing apparatus according to claim 1, wherein the processor is further configured to associate one of the selected third user or the type of the selected third user with the notification information based on reception of information of user operation on a graphical user interface of the first terminal.

3. The information processing apparatus according to claim 1,
wherein the notification information indicates the result of the behavior recognition with respect to the first user.

4. The information processing apparatus according to claim 1,
wherein the processor is further configured to determine the notification information based on one of a surrounding situation of the first user or location information of the first user.

5. The information processing apparatus according to claim 1,
wherein the processor is further configured to determine the notification information based on a time of execution of the behavior recognition with respect to the first user.

6. The information processing apparatus according to claim 1,
wherein the processor is further configured to determine the notification information based on a degree of relevance between the first user and the selected third user.

7. The information processing apparatus according to claim 1, wherein
the sensing data further comprises illuminance detected by an illuminance sensor of the first terminal, and
the processor is further configured to:
restrict the transmission of the notification information to the second terminal in a case where the illuminance is less than a determined threshold value; and
withdraw the restriction of the transmission of the notification information to the second terminal in a case where the motion of the first terminal satisfies a determined movement pattern.

8. The information processing apparatus according to claim 1,
wherein the processor is further configured to select the third user based on location information of the first user.

9. The information processing apparatus according to claim 1,
wherein the processor is further configured to select the third user based on content browsed by the first user.

10. The information processing apparatus according to claim 1,
wherein the processor is further configured to select the third user based on a participation of the first user in an event.

11. The information processing apparatus according to claim 1,
wherein the processor is further configured to select the third user based on one of a communication period or a communication frequency of the third user with the first user.

12. The information processing apparatus according to claim 1,
wherein the processor is further configured to select the third user based on a current communication partner of the first user.

13. The information processing apparatus according to claim 1, wherein
the processor is further configured to select the third user based on recognition of an object in an image, and
the image is picked up by the first terminal associated with the first user.

14. The information processing apparatus according to claim 1,
wherein the communication content includes sound data.

15. The information processing apparatus according to claim 1,
wherein the processor is further configured to select the third user based on a result of behavior recognition with respect to the second user different from the first user.

16. The information processing apparatus according to claim 1, wherein the designation of the determined operation to be executed by the second terminal comprises one of:
a vibration of the second terminal at larger vibration strength as the degree of similarity is higher; and
blink of an LED of the second terminal in a quicker blink pattern as the degree of similarity is higher.

17. An information processing method, comprising:
in an information processing apparatus that comprises a processor:
receiving, by the processor, via a communication network, communication content of a first user and a second user from a first terminal associated with the first user;
receiving, by the processor, sensing data of at least one sensor of the first terminal via the communication network, wherein the sensing data comprises at least one of motion of the first terminal or image data captured by the first terminal;

analyzing, by the processor, the communication content of the first user and the second user;

extracting, by the processor, a word from the analyzed communication content;

selecting, by the processor, a third user based on the extracted word and a result of behavior recognition with respect to the first user;

determining, by the processor, notification information based on a type of the selected third user;

determining, by the processor, whether the notification information is to be transmitted to a second terminal in a case where the at least one of the motion of the first terminal or the image data satisfies a determined condition; and controlling, by the processor, based on the determination that the notification information is to be transmitted, transmission of the notification information to the second terminal, wherein the second terminal is associated with the selected third user, and the notification information comprises a designation of a determined operation at the second terminal based on a degree of similarity between the result of the behavior recognition with respect to the first user and a result of behavior recognition with respect to the selected third user.

18. A non-transitory computer-readable medium having stored thereon computer-executable instructions, which when executed by a processor of an information processing apparatus, cause the processor to execute operations, the operations comprising:

receiving, via a communication network, communication content of a first user and a second user from a first terminal associated with the first user;

receiving sensing data of at least one sensor of the first terminal via the communication network, wherein the sensing data comprises at least one of motion of the first terminal or image data captured by the first terminal;

analyzing the communication content of the first user and the second user;

extracting a word from the analyzed communication content;

selecting a third user based on the extracted word and a result of behavior recognition with respect to the first user;

determining notification information based on a type of the selected third user;

determining whether the notification information is to be transmitted to a second terminal in a case where the at least one of the motion of the first terminal or the image data satisfies a determined condition; and controlling, based on the determination that the notification information is to be transmitted, transmission of the notification information to the second terminal of the notification information, wherein the second terminal is associated with the selected third user, and the notification information comprises a designation of a determined operation at the second terminal based on a degree of similarity between the result of the behavior recognition with respect to the first user and a result of behavior recognition with respect to the selected third user.

\* \* \* \* \*